(12) United States Patent
Itoh et al.

(10) Patent No.: US 7,509,118 B2
(45) Date of Patent: Mar. 24, 2009

(54) HEAD SET APPARATUS, COMMUNICATION TERMINAL APPARATUS AND COMMUNICATION SYSTEM

(75) Inventors: Katsutoshi Itoh, Tokyo (JP); Mitsuyoshi Yasuda, Tokyo (JP); Makoto Natori, Saitama (JP); Osamu Yoshimura, Kanagawa (JP); Minoru Yokoshi, Tokyo (JP); Takeshi Itagaki, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 536 days.

(21) Appl. No.: 11/170,670

(22) Filed: Jun. 29, 2005

(65) Prior Publication Data

US 2006/0003815 A1  Jan. 5, 2006

(30) Foreign Application Priority Data

Jun. 30, 2004  (JP)  ............................ P2004-220958

(51) Int. Cl.
  *H04M 1/66* (2006.01)
  *H04M 1/68* (2006.01)
  *H04M 3/16* (2006.01)
  *H04B 7/00* (2006.01)
  *H04M 1/00* (2006.01)

(52) U.S. Cl. .................... 455/410; 455/411; 455/575.2; 455/41.2

(58) Field of Classification Search .................. 455/410, 455/411, 569.1, 575.2, 90.1, 415, 41.2, 41.3, 455/522, 127.1, 550.1; 381/367, 370, 376, 381/74

See application file for complete search history.

(56) References Cited

U.S. PATENT DOCUMENTS 6,928,295 B2 *  8/2005  Olson et al. .................. 455/522

FOREIGN PATENT DOCUMENTS

| JP | 2001 352579 | 12/2001 |
|----|-------------|---------|
| JP | 2001 358827 | 12/2001 |
| JP | 2003 134224 | 5/2003 |
| JP | 2004 153439 | 5/2004 |

* cited by examiner

*Primary Examiner*—Eugene Yun
(74) *Attorney, Agent, or Firm*—Frommer Lawrence & Haug LLP; William S. Frommer; Thomas F. Presson

(57) ABSTRACT

A head set apparatus capable of a wireless communication by a predetermined wireless communication system. The wireless communication system includes at least a first communication mode and a second communication mode. The first communication mode enables a data transfer with a partner apparatus and a second communication mode carries out a wireless communication with the partner apparatus with a period shorter than that of the communication in the first communication mode while the wireless connected state remains. The head set apparatus includes a communication section for carrying out a wireless communication by the predetermined wireless communication system and a control section for making the head set function as a head set when the communication state in the communication means is in the first communication mode and for making the head set function as a wireless key for security when the communication state is in the second communication mode.

5 Claims, 19 Drawing Sheets

HEAD SET APPARATUS, COMMUNICATION TERMINAL APPARATUS AND COMMUNICATION SYSTEM

CROSS REFERENCES TO RELATED APPLICATIONS

The present invention contains has recognized/(object) matter related to Japanese Patent Application JP 2004-220958 filed in the Japanese Patent Office on Jun. 30, 2004, the entire contents of which being incorporated herein by reference.

BACKGROUND OF THE INVENTION

1. Field of the Invention

The present invention relates, for example, to a communication terminal apparatus such as a mobile telephone terminal, to a head set apparatus carrying out a wireless communication with the communication terminal apparatus and to a communication system constituted by these apparatuses.

2. Description of the Related Art

In recent years, a mobile telephone terminal which is one of communication terminal apparatuses a user always taking along in possession has a trend such that various functions other than wireless telephone functions of primary functions are built-in so as to contain multi functions.

For example, there exists such a terminal in which a camera function carrying out a filming of a still picture and a moving picture, a recording and reproducing function of music data, a viewing and listening function of television broadcast or the like is built-in.

In addition, there has been developed a mobile telephone terminal in which a function as a non-contacting IC card which has been prevailing rapidly in recent years is built-in. This non-contacting IC card is utilized as a boarding ticket of transport facilities, a membership card, an employee ID card, a card for price settlement means at a shop or the like where an authentication process is carried out by performing wireless communication between adjacent reader and writer, so that it is easy-to-use as compared with a magnetic card or the like. It should be noted in a case when an IC card function unit is mounted in a mobile terminal that the IC card function unit is not always necessarily to have a card type shape.

And now, it is preferable for the mobile telephone terminal having multi functions in this manner to be carried out with a process in order to secure some kind or another security for preventing various functions provided in the terminal from being abused when the terminal is lost. In particular, in case of a terminal installed with an IC card function unit, there is a possibility that personal information stored as the IC card function is read out unjustly or unjust settlement or the like utilizing the IC card function is carried out, so that the necessity for a function for preventing the unjust use thereof is high. There are descriptions, for example, in patent documents 1 and 2 that a wireless card which forms a pair with respect to the mobile telephone terminal is prepared and authentication request is wireless-transmitted periodically from that wireless card such that the functions of mobile telephone terminal is made to be restricted in a case when collation with respect to the authentication request cannot be taken.

[Patent Document 1] Jap. laid-open patent publication No. 2001-352579

[patent document 2] Jap. laid-open patent publication No. 2001-358827

However, it is necessary for the apparatus described in the patent document 1 and 2 to prepare a wireless card for exclusive use for utilizing the security system of the mobile communication terminal. For example, it is possible to enjoy hands-free conversations pleasantly by using a head set which carries out short distance wireless communication with a mobile telephone terminal, but the management becomes troublesome for a user in a case when a wireless key for security is added thereto, because management objective devices such as hanging a wireless card down around the neck by using a neck strap in addition to putting on a head set on a head portion will increase. As described above, it is desirable to be able to realize in the same device at the same time with a plurality of functions including a wireless key function by mounting it, for example, in the device presently used and by avoiding the use of a wireless key apparatus for exclusive use for the security system for the mobile communication terminal.

SUMMARY OF THE INVENTION

In view of such matters, the present invention has recognized that the wireless key apparatus for security and the head set function are integrated so as to realize both of the head set and the security function in the same device at the same time.

In order to solve aforementioned problems and to achieve the recognition, the present invention relates to a system including a head set apparatus and a communication terminal apparatus which can wireless-communicate with the head set apparatus according to a predetermined wireless communication system and has a feature such that said predetermined wireless communication system at least possesses a first communication mode which makes data transfer with a partner apparatus to communicate and a second communication mode carrying out a wireless communication with the partner apparatus for a communication period longer than the communication in said first communication mode under a wireless connected state remains are included; the head set apparatus is provided with communication means carrying out a wireless communication by the predetermined wireless communication system and control means which makes the head set apparatus function as a head set when the communication state of the communication means is a first communication mode and makes the head set apparatus function as a wireless key for security when the communication state is in the second communication mode; and the communication terminal apparatus is provided with communication means carrying out a wireless communication by the predetermined wireless communication system and control means for making the head set apparatus data-communicate with the communication partner apparatus when the communication state of the communication means is a first communication mode and for making the head set apparatus function as a wireless key for security when the communication state is in the second communication mode.

According to such an invention as the present invention, there are proposed a function for presuming the distance between wireless devices by utilizing a short distance wireless communication a head set function which the Bluetooth system possesses at the same time by means of one device. When this wireless key function and the head set function are integrated, the transmission power of the wireless communication is changed between for the operation as a distance presumption (security) and for the operation as a head set function. For example, in the power control, power is set corresponding to a distance presumed when presuming the distance and the power is controlled for transmitting with a high output in order to maintain the transmission during the telephone call as a head set function.

According to the present invention, it is possible to integrate a wireless device for security and a wireless head set function. It is enough for a user only to carry a single device and a plurality of functions can be mounted in a single device, so that it is possible to supply a system by an inexpensive cost.

DESCRIPTION OF THE PREFERRED EMBODIMENTS

Hereinafter, an example of one embodiment of the present invention will be explained with reference to FIGS. 1 to 19.

In the present invention, a wireless key apparatus carrying out a wireless communication with a mobile telephone terminal apparatus is prepared and it is constituted such that security lock of the mobile telephone terminal apparatus is to be carried out according to a wireless communication state of the both sides.

Figure 1:
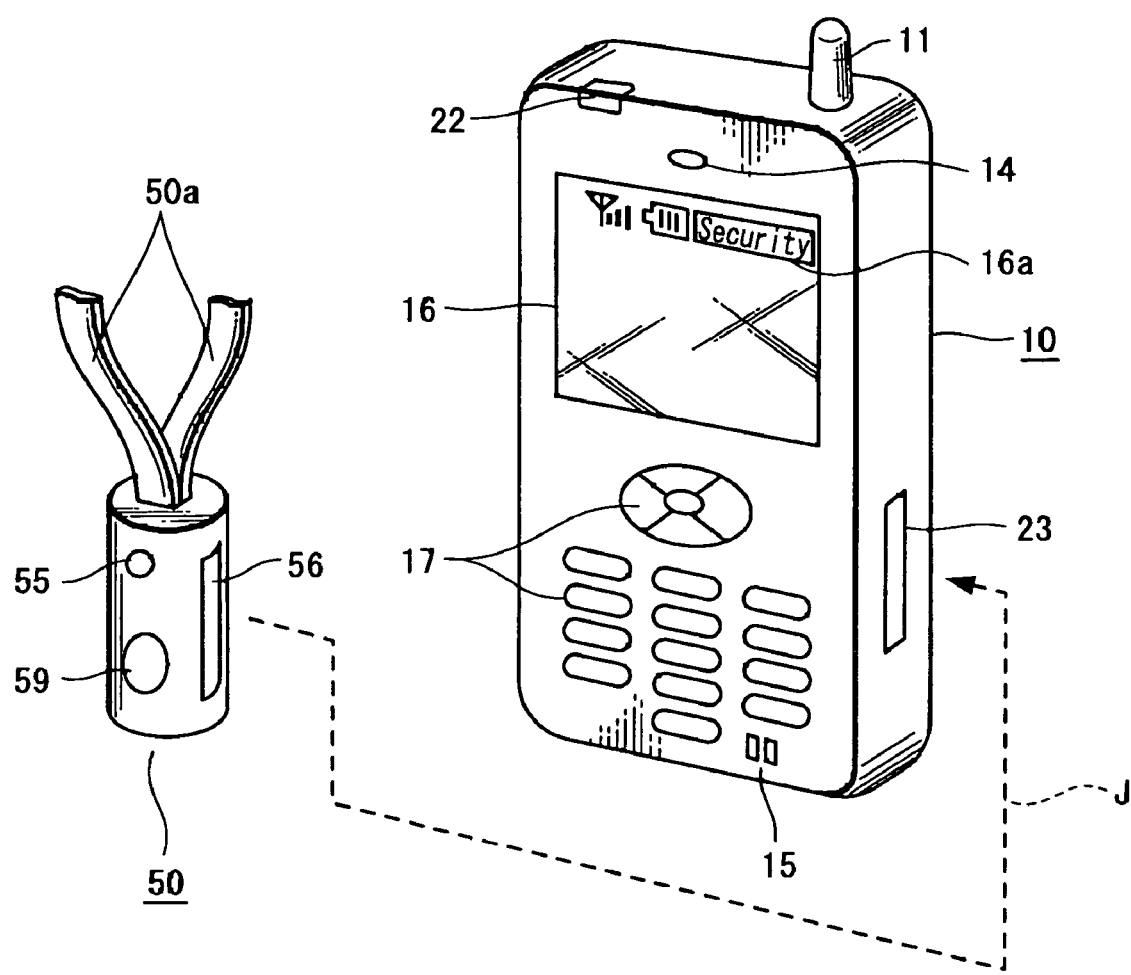
FIG. 1 is a perspective view showing a system constitutional example according to one exemplified embodiment of the present invention.

FIG. 1 is a diagram showing an example of an apparatus of the present invention. A wireless key apparatus 50 is prepared as a separate body with a mobile telephone terminal apparatus 10. According to this example, the wireless key apparatus 50 is constituted in a smaller size as compared with the mobile telephone terminal apparatus 10 and, for example, it is constituted such that it is hung around the neck of a user by a neck strap 50a or the like and is made to be a small sized shape which a user can always wear. The wireless key apparatus 50 is arranged with a light emitting unit 55 and an operation unit 59 (constituted in FIG. 1 such that they are push button shaped), and it is also constituted such that a terminal unit 56 for connecting with the mobile telephone terminal apparatus 10 is prepared.

As a mobile telephone terminal apparatus 10, there is shown here an example of a general mobile telephone terminal. In the mobile telephone terminal apparatus 10, there are arranged an antenna 11 for a wireless telephone communication, a speaker 14, a microphone 15, a display unit 16, an operation unit (operation key) 17, a light emitting unit 22 and the like. Also, a terminal unit 23 for connecting with the wireless key apparatus 50 is prepared. This terminal unit 23 may be used as an existing terminal which is prepared for the mobile telephone terminal apparatus 10 to be connected with a charger or various external apparatuses. Also, it may be constituted in the display unit 16 such, for example, that a security display 16a showing that it is in an operation under a state that security is assured as explained hereinafter and a display (not shown) showing a fact that a so-called security lock in which the operation is limited according to its security function is executed may be carried out.

Figure 2:
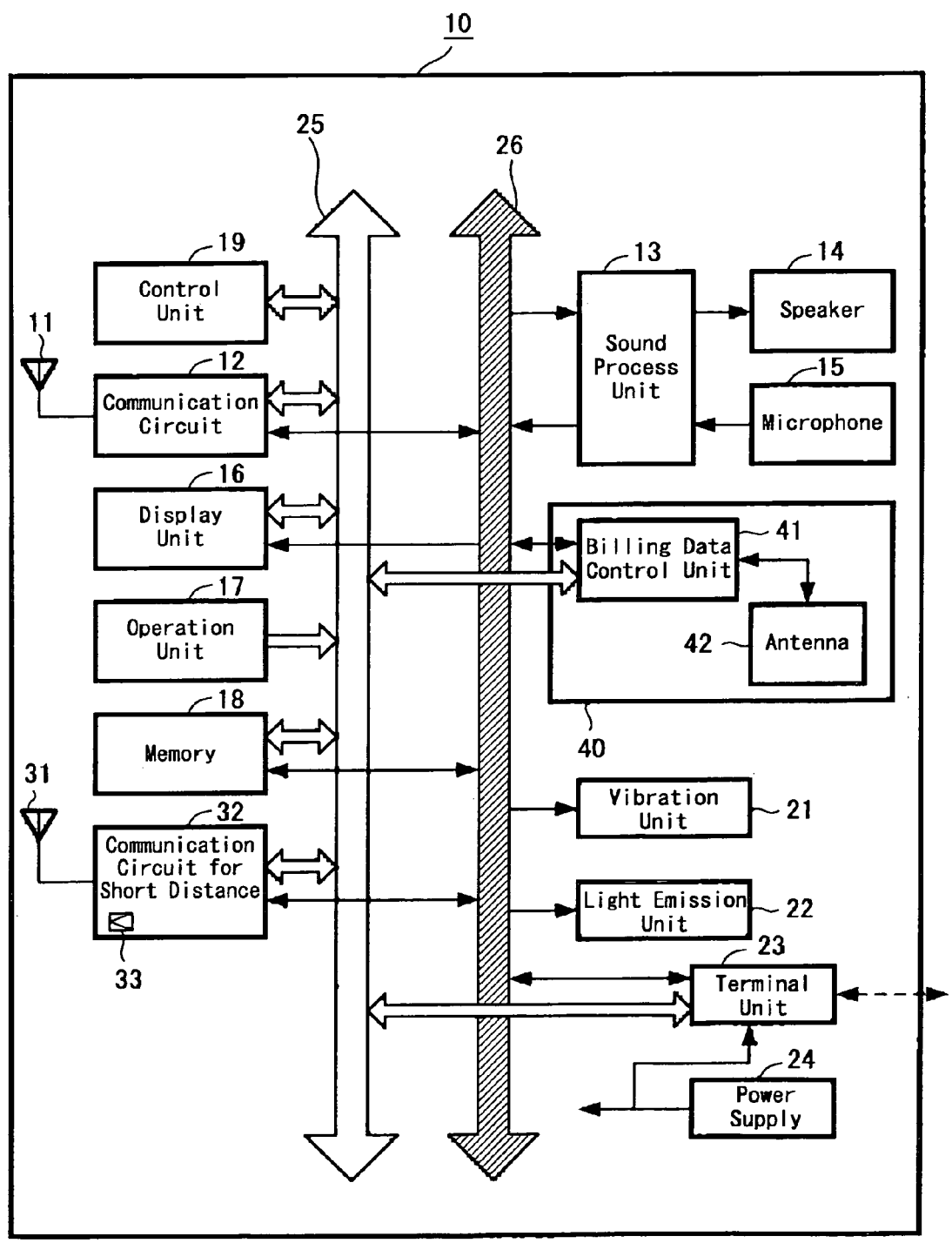
FIG. 2 is a block diagram showing a constitutional example of a communication terminal apparatus according to one exemplified embodiment of the present invention.

Next, a constitutional example of the mobile telephone terminal apparatus 10 of the present invention will be explained with reference to FIG. 2. The mobile telephone terminal apparatus 10 of the present invention is provided with an antenna 11 for a wireless telephone communication for carrying out a wireless communication with a base station for a wireless telephone. The antenna 11 is connected to a communication circuit 12 for a wireless telephone communication so as to carry out a wireless communication with the base station under a control of a control unit 19. When a communication for a telephone call is carried out in the communication circuit 12, received sound data are supplied to a sound data processing unit 13 so as to perform a receiving process of the sound data and thereafter, they are supplied to a speaker 14 to be outputted and also, sound data for transmission which are picked up by a microphone 15 and processed in the sound data processing unit 13 are supplied to the communication circuit 12 to be transmitted.

The mobile telephone terminal apparatus 10 is provided with a display unit 16 constituted by a liquid crystal display or the like and an operation unit 17 constituted by operation keys or the like. It is possible to display a mail sentence, a picture screen accessed to the web or the like on the display unit 16 an input operation of a telephone number, a mail sentence or the like and various mode settings or the like can be carried out by an operation unit 17.

These respective blocks in the terminal apparatus 10 are connected with the control unit 19 or the like by way of a control line 25. Also, each block is constituted such that data transfer can be carried out by way of a data line 26 so as to store necessary data in a memory 18. In the memory 18, not only data necessary as a mobile telephone terminal are stored but also it is possible to store data necessary in an IC card function unit 40 which will be described later on. Also, a necessary data saving for executing a program and/or for realizing the security function thereof can be carried out in the memory 18.

Also, the mobile terminal apparatus 10 is provided with a vibration unit 21 constituted by a vibration motor or the like which vibrates the terminal itself for carrying out notification of receiving signal by way of the telephone line to this terminal apparatus 10 and various warnings and a light emitting unit 22 constituted by a light emitting diode or the like. Then, the vibration and the light emission are carried out under a control of the control unit 19. These vibration unit 21 and light emitting unit 22 are used as notification means for notifying receiving signal or the like for the mobile telephone terminal and they are used also for necessary warning means as a security function. It should be noted that it is possible to output warning sound from the speaker 14 or the like in a case when sound is to ring as necessary warning means in the security function.

Then, the mobile telephone terminal 10 of the present invention is provided with a communication circuit 32 for short distance wireless communication in addition to the communication circuit 12 for telephone communication. Then, it is carried out by using this communication circuit 32 a wireless communication with a partner within a relatively narrow region of, for example, around from several meters to hundred meters at the maximum by way of a connected antenna 31 (however, it is constituted such that a process for narrowing the communication possible region is to be executed when carrying out a communication during a normal period with the wireless key apparatus as will be described later on). Here, for example, a wireless communication system for short distance referred to as Bluetooth® is applied. In this short distance wireless communication, various kinds of use applications are supposed such, for example, that a communication is carried out with a head set for a hands-free telephone call or a communication with a personal computer apparatus is carried out through the mobile telephone terminal apparatus 10. As to the frequency band used for the wireless communication, for example, 2 GHz band is used, it is constituted such that a frequency band or modulation system which does not intervene in the wireless telephone communication in the communication circuit 12 is employed. According to this constitution, it is possible to carry out the wireless telephone communication in the communication circuit 12 and the communication in the communication circuit 32 for short distance wireless communication at the same time.

In case of this example, a wireless communication is carried out with a wireless key apparatus 50 by using this communication circuit 32 for short distance communication. However, a wireless communication is possible also with an apparatus (head set, personal computer apparatus or the like) other than the wireless key apparatus 50 if it is a communication apparatus of the same communication system. Also, in a case when a security function is executed, the wireless key apparatus 50 carrying out a wireless communication by the communication circuit 32 is to be limited to a specific one apparatus. For that purpose, for example, identification ID or the like of the apparatus is to be registered in the memory 18 or the like beforehand. With respect to registered information relating to this wireless key apparatus 50, it may be constituted such that a user cannot revise it.

A transmission amplifier 33 which amplifies the transmission signal in the communication circuit 32 is constituted such that transmission power is to be set in a plurality of steps by the control of the control unit 19 or the like. Also, in a state in which it is wireless-connected with the wireless key apparatus 50, it is constituted such that low transmission power among the plurality of steps is to be set. Further, in a state in which it is connected with an apparatus other than the wireless key apparatus 50, transmission power of a relatively high step is to be set. It should be noted in a case when it is wireless-connected with an apparatus installed a function for a wireless key apparatus such as a head set which will be described later on that the transmission power is to be set depending on the operation state of the partner apparatus at that time (more specifically, depending on whether or not it is operated only as a wireless key apparatus or whether or not combined another function is operated). It will be described later on with respect to a concrete process example for setting the transmission power.

The mobile telephone terminal 30 of the present invention is provided with a non-contacting IC card function unit 40. The non-contacting IC card function unit 40 includes a billing data control unit 41 connection with an antenna 42 and an adjacent wireless communication in a very adjacent distance of around several centimeters is carried out with reader and writer. In this adjacent wireless communication, it is possible to operate the billing data control unit 41 by means of the power obtained by receiving a radio wave from the reader and writer side, but according to this example, it is constituted such that the billing data control unit 41 is to be operated by the power supply supplied from a power supply circuit 24 in the mobile telephone terminal 10.

When the IC card function is executed, the billing data control unit 41 reads out data necessary for billing or authentication from the memory 18 (or a memory in the billing data control unit 41 (not shown)) and an exchange of the read out data is carried out with the reader and writer by an adjacent wireless communication. For example, in a case when it is functioned as a boarding ticket of transport facilities, it is constituted such that the billing data control unit 41 transmits data charged amount of money or the like which is possible to be paid by direct debit for an effective zone and an effective period as a boarding ticket (commutation ticket) or as a boarding ticket or personal information or the like relating to a person possessing this terminal (IC card) to the reader and writer so as to carry out a billing process or an authentication process. In case of using an employee ID card, a membership card, a card for price settlement, a credit card or the like, necessary information for its authentication is also exchanged.

Further, it is constituted such that the mobile telephone terminal apparatus 10 of the present invention is provided with a terminal unit 23 and various peripheral apparatuses, data process apparatuses which are not shown or the like can be connected directly thereto by way of this terminal 23. In this case, it is constituted such that power supply can be applied to external apparatuses connected by means of the terminal unit 23 from the power supply circuit 24 installed with a secondary battery or the like which applies power supply to respective portions in the mobile telephone terminal apparatus 10. For example, as shown by an arrow J of a dotted line in FIG. 1, it is constituted in a case when the terminal unit 56 of the wireless key apparatus 50 and the terminal unit 23 of this mobile telephone terminal apparatus 10 are connected directly such that it is possible to supply power to a secondary battery in the wireless key apparatus 50 from the power supply circuit 24 in the mobile telephone terminal apparatus 10 so as to charge it. Also, it is constituted in a case when the wireless key apparatus 50 is connected directly to the terminal unit 23 of the mobile telephone terminal apparatus 10 such that the control unit 19 of the mobile telephone terminal apparatus 10 detects that fact and a security process when directly connected (for example, security process executed without short distance wireless communication which will be described later on) is to be carried out.

Figure 3:
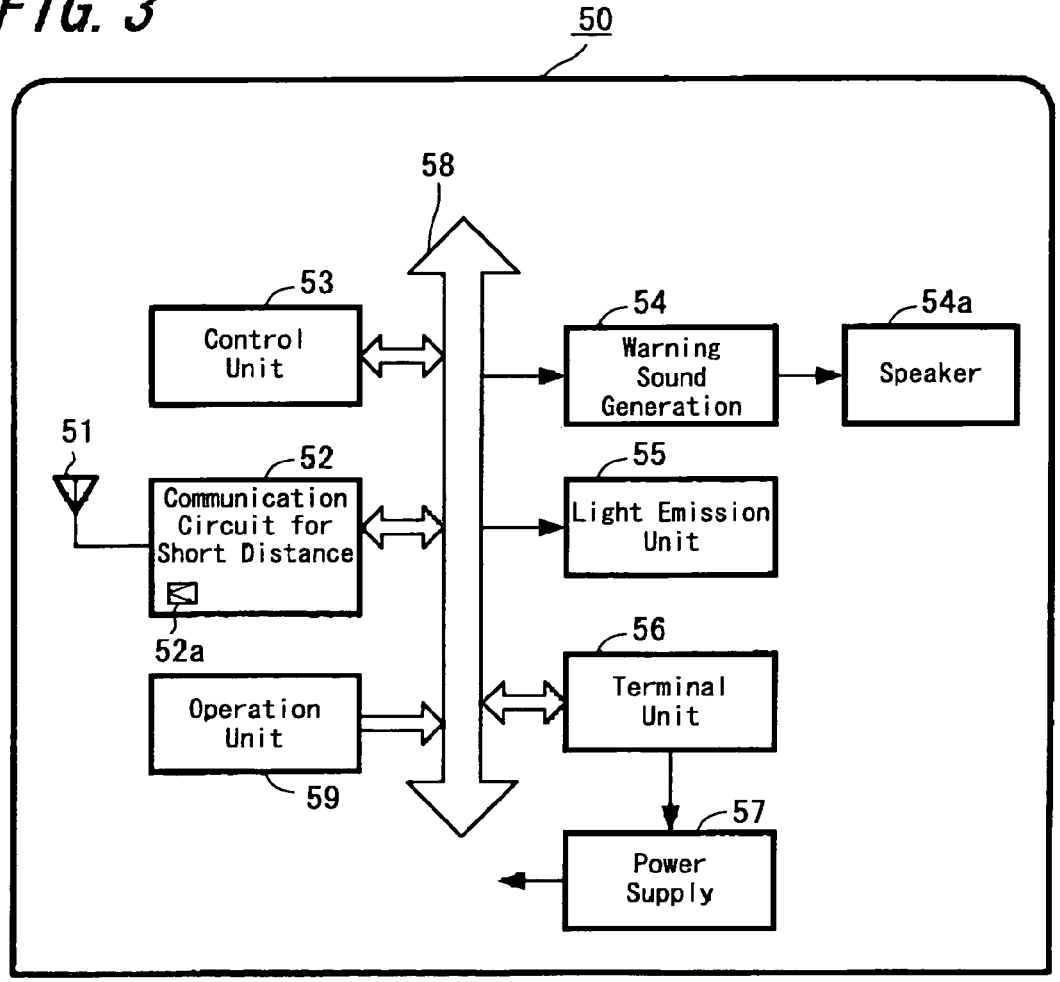
FIG. 3 is a block diagram showing a constitutional example of a wireless key apparatus according to one exemplified embodiment of the present invention.

Next, it will be explained with respect to the constitution of the wireless key apparatus 50 which carries out a wireless communication with the mobile telephone terminal apparatus 10 according to the present invention with reference to FIG. 3. The wireless key apparatus 50 of the present invention is provided with a communication circuit 52 for short distance wireless communication. Then, by using this communication circuit 52, a wireless communication is carried out with a partner in a relatively narrow region of, for example, around several meters and at the maximum hundred meters by way of a connected antenna 51 (however, it is constituted when communication is carried out normally with the mobile telephone terminal apparatus 10 such that a process for narrowing the communication possible region is executed). Here, it is constituted such that Bluetooth system which is a short distance wireless communication system provided on the mobile telephone terminal apparatus 10 side is also applied to the wireless key apparatus 50. The partner carrying out a wireless communication by the communication circuit 52 is limited to a specific one of the mobile telephone terminal apparatus 10. For that purpose, for example, the identification ID or the like of its apparatus was registered beforehand. With respect to the registered information as to the mobile telephone terminal apparatus 10, it may be constituted such that a user cannot revise it.

With respect to the wireless communication in the communication circuit 52, it is executed under a control of a control unit 53. In this case, it is constituted such that transmission power is to be set in a plurality of steps in a transmission amplifier 52a which amplifies a transmission signal in the communication circuit 52 under a control of the control unit 53 or the like. Also, in a state where it is wireless-connected with the mobile telephone terminal apparatus 10, a low transmission power is to be set in the plurality of steps. However, it is constituted in a case when the control unit 53 detects that an operation unit 59 (button shaped operation unit or the like as shown in FIG. 1) arranged in the wireless key apparatus 50 is operated such that a process for heightening the transmission power temporarily in the transmission amplifier 52a is to be carried out.

The wireless key apparatus 50 of this example is provided with a warning sound creation unit 54 connected with a speaker 54a for outputting warning sound and a light emitting unit 55 constituted by a light emitting diode or the like. Then, output of the warning sound, vibration and light emission are carried out under the control of the control unit 53. These warning sound creation unit 54 and light emitting unit 55 are used as warning means necessary for security function. Also, it is constituted such that the light emitting unit 55 functions also as display means which displays the security mode at present in a state where a wireless communication is carried out with the mobile telephone terminal apparatus 10 and the security function is operated. Specifically, for example, the light emitting unit 55 functions also as display means for displaying a security mode by changing the display such that when the light emitting unit 55 is blinking in green, it indicates that it is in a normal mode and when it is blinking in red, it indicates that it is in a warning mode, when there is no display at all, it indicates that it is in a function limitation mode, or the like. The display means for displaying the security mode may be constituted such that a liquid crystal display or the like is used and a display where modes can be recognized directly by characters and figures or the like is carried out. Also, it may be constituted as warning means for warning by vibration.

It is constituted such that the control unit 53 and each unit is connected by means of a control line 58 and a wireless communication in the communication circuit 52, operations in the warning sound creation unit 54 and the light emitting unit 55 and the like are executed under a control of the control unit 53.

Also, it is constituted such that the wireless key apparatus 50 of the present invention is provided with a terminal unit 56 and the mobile telephone terminal apparatus 10 can be connected directly by using this terminal 56. When connected thereof, the control unit 53 in the wireless key apparatus 50 carries out a data transfer directly with the control unit 19 in the mobile telephone terminal apparatus 10 and carries out a security process when directly connected without carrying out a short distance wireless communication. Also, in a case when remaining charge amount of the secondary battery installed in a power supply circuit 57 in the wireless key apparatus 50 is small, it is possible to charge the secondary battery in the power supply circuit 57 by a power supplied from the side of the mobile telephone terminal apparatus 10.

Figure 4:
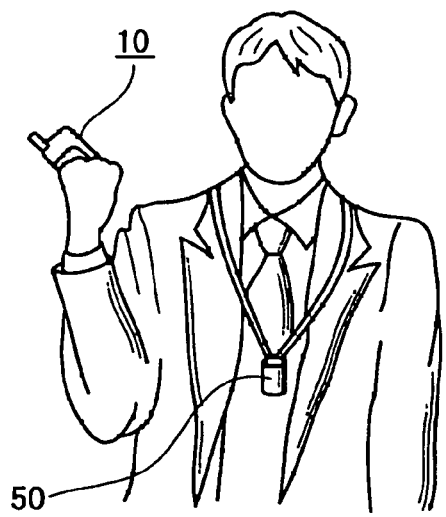
FIG. 4 is an explanatory diagram showing a usage example according to one exemplified embodiment of the present invention.

When the mobile telephone terminal apparatus 10 and the wireless key apparatus 50 constituted in this manner are used, a user always carries the wireless key apparatus 50 as shown, for example, in FIG. 4. Then, it is constituted such that when the user uses the mobile telephone terminal apparatus 10, the function is not to be limited (normal mode which will be described later on). Then, in a case when a user goes away from the mobile telephone terminal apparatus 10 by a distance of a certain degree after putting the mobile telephone terminal apparatus 10 somewhere in a state where the wireless key apparatus 50 is always maintained to be carried, a warning operation is executed from the wireless key apparatus 50 (warning mode which will be described later on). If he stays away from the mobile telephone terminal apparatus 10 in a state where the warning operation is executed, it becomes a state where the function of the mobile telephone terminal apparatus 10 is limited (function limitation mode which will be described later on). It should be noted with respect to the warning operation in a warning mode that it may be constituted such that it is to be carried out only on the side of the mobile telephone terminal apparatus 10. Alternatively, it may be constituted such that the warning operation in the warning mode is to be carried out in both of the wireless key apparatus 50 and the mobile telephone terminal apparatus 10.

With respect to a function of the mobile telephone terminal apparatus 10 which is limited in a function limitation mode, it is a choice, for example, to direct to all of the functions of the mobile telephone terminal apparatus 10 (however, communication function related to security function is not to be limited) and it is another choice to direct to a partial function within the function which the terminal apparatus 10 is provided with. Specifically, it may be constituted, for example, such that only the process using the non-contacting IC card function unit 40 is to be limited. Also, it may be constituted such that address book inspection of the mobile telephone terminal apparatus 10, display of personal information of mail inspection or the like is to be limited. Also, it may be constituted such that only the reception of a signal can be allowed while the transmission as a wireless telephone is to be limited. Also, it may be constituted such that only the reception of a signal can be allowed while the transmission as a wireless telephone is to be limited. In this case, it may be constituted such that only the telephone number for emergency announcement to a police station or the like can be transmitted. Also, it may be constituted such that a process using the non-contacting IC card function unit 40 is not to be limited while only the function as a wireless telephone apparatus is to be limited.

Next, it will be explained with respect to a process example in a case when a security process is carried out by preparing the mobile telephone terminal apparatus 10 and the wireless key apparatus 50 of such a constitute.

Figure 5:
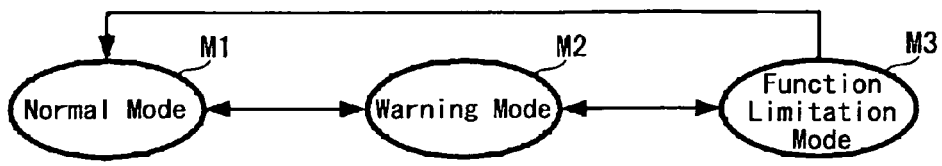
FIG. 5 is an explanatory diagram showing a setting example of a security mode according to one exemplified embodiment of the present invention.

First, it will be explained with reference to FIG. 5 with respect to a security process mode (hereinafter designates as security process mode). It is constituted in case of this example such that there are prepared a normal mode M1 which does not limit the function of the mobile telephone terminal apparatus 10, a warning mode M2 for warning that it gets out of the normal mode caused by a fact that the distance between the mobile telephone terminal apparatus 10 and the wireless key apparatus 50 goes away or the like and a function limitation mode M3 for limiting the function of the mobile telephone terminal apparatus 10 in a case when it does not return to from the warning mode to the normal mode (more specifically, in a case when the distance between the mobile telephone terminal apparatus 10 and the wireless key apparatus 50 remains in a far state).

Figure 7:
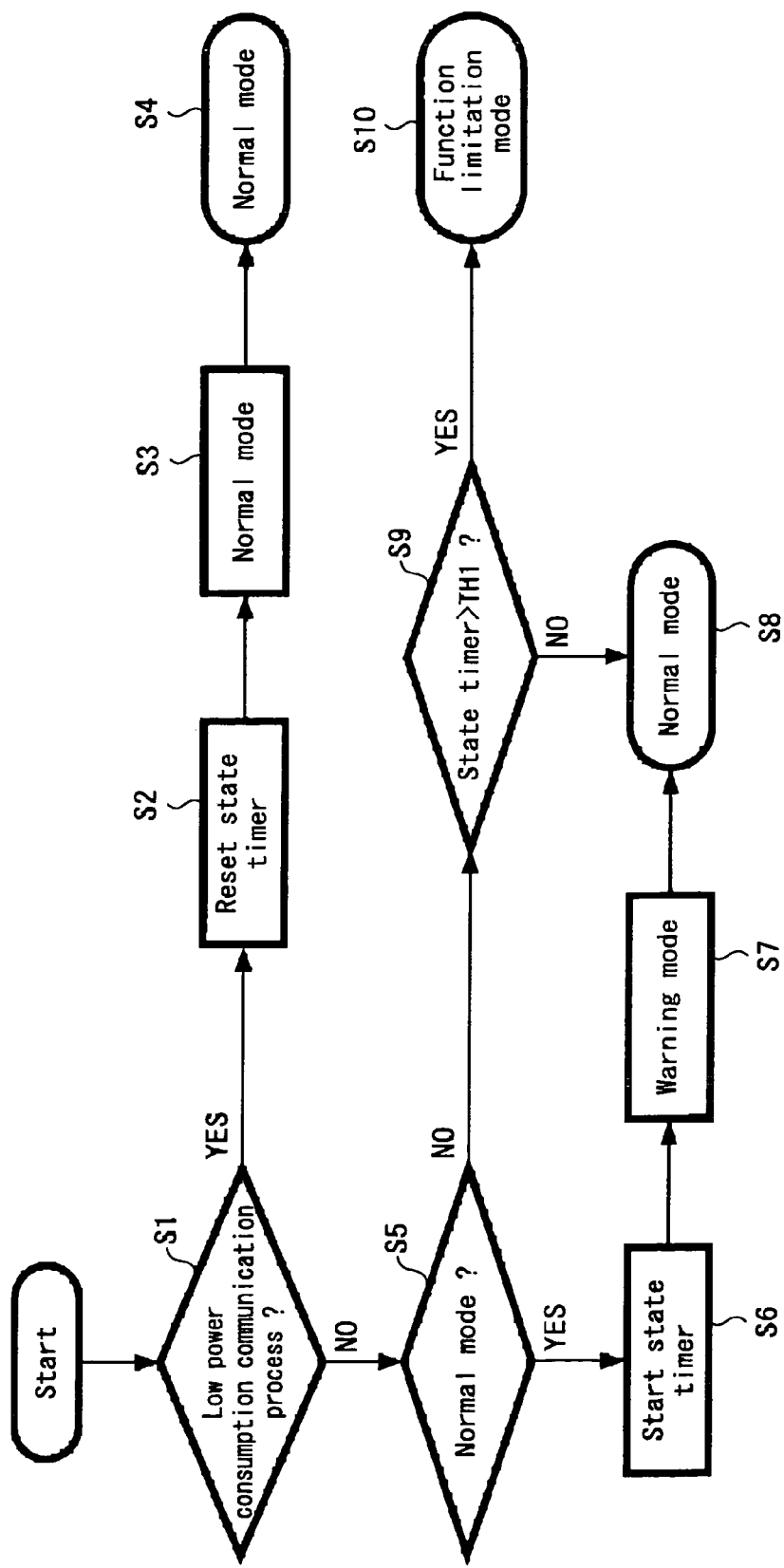
FIG. 7 is a flowchart showing a mode selection process example according to one exemplified embodiment of the present invention.

With respect to the transition of these modes, there are, as shown by arrows in FIG. 7, a change from the normal mode M1 to the warning mode M2 and a change from the warning mode M2 to the function limitation mode M3 and further, it returns to the normal mode M1 if the wireless key apparatus 50 approaches the mobile telephone terminal apparatus 10 in a state in which it became the function limitation mode M3.

Further, it returns to the normal mode M1 if the wireless key apparatus 50 approaches the mobile telephone terminal apparatus 10 in a state in which it became the warning mode M2 and the warning operation is carried out.

Figure 6:
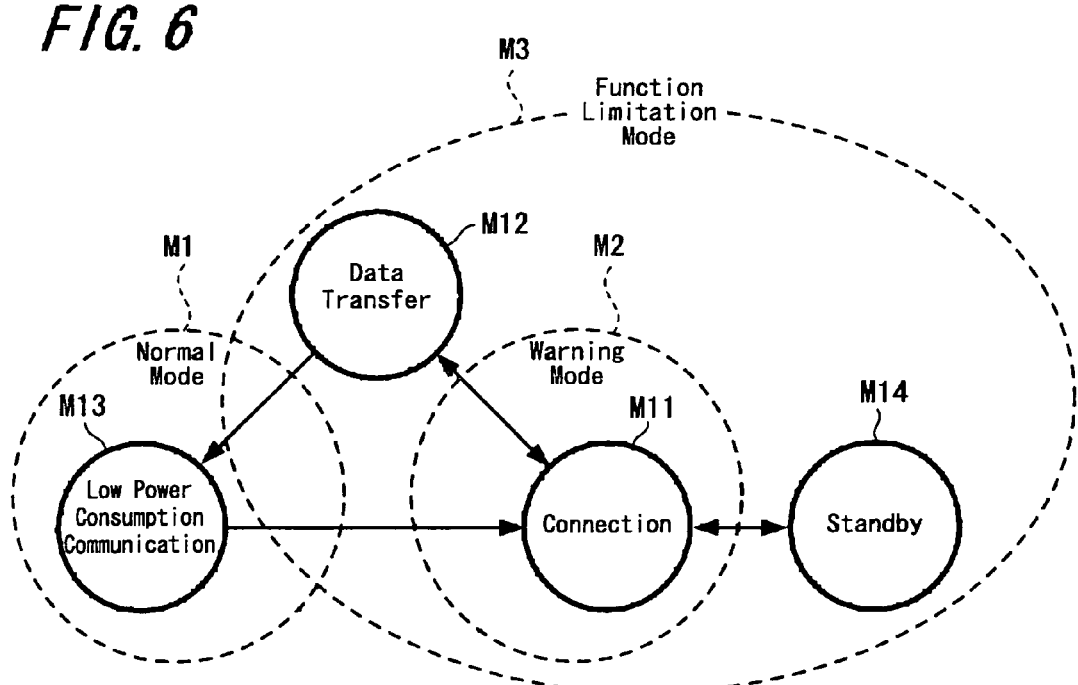
FIG. 6 is an explanatory diagram showing a transition example of a security mode by a communication mode according to one exemplified embodiment of the present invention.

In case of the present invention, these security modes are made to have relation with the communication modes prepared in the Bluetooth system which is a wireless communication system between the mobile telephone terminal apparatus 10 and the wireless key apparatus 50. More specifically, as communication modes in the wireless communication system (Bluetooth system) of this example are shown in FIG. 6, there is a connection mode M11 for authenticating and wireless-connecting the partner apparatus in both of the mobile telephone terminal apparatus 10 and the wireless key apparatus 50 and when authentication is completed mutually and connection is carried out in the connection mode M11, it becomes a data transfer mode M12 in which payload data transfer is carried out practically. When the data transfer is completed in the data transfer mode M12, it is shifted to a low power consumption communication mode M13. In this low power consumption communication mode M13, the wireless communications of both sides are carried out intermittently by a cycle longer than a communication cycle in the data transfer mode M12 and it becomes a state in which the wireless connection between the both sides is maintained. Owing to the fact that the cycle carrying out the intermittent communication is long in this manner, it becomes possible to make the power consumption required for the communication smaller than a case in which it is operated in the data transfer mode M12 and low power consumption is realized. It should be noted that the low power consumption here indicates a phenomenon that the low power consumption is realized by thinning out communication cycles and is not related directly to the process for lowering the transmission power which will be described later on (however, it is constituted as described later on such that a process for lowering transmission power is carried out during a low power consumption mode).

In a case when the data transfer between the both sides is to be restarted in a state of this low power consumption communication mode M13, it returns to the connection mode M11, a process for restarting the communication is carried out in the connection mode M11 and thereafter it becomes the data transfer mode M12 in which the data transfer is carried out practically. In a state in which the wireless connection is maintained in the low power consumption communication mode M13, the connection process in the connection mode M11 is carried out relatively simply and it is possible to carry out the restart of the data transfer rapidly as compared with a case in which the wireless connection is recommenced.

Also, in a case when a connection process with anyone of communication partners is not carried out in the connection mode M11 (or in a case when a connection is not possible), each apparatus is shifted to the standby mode M14. The apparatus which becomes this standby mode M14 carries out an intermittent reception or transmission with a very long cycle and carries out a process for searching whether or not a communication apparatus to become a partner exists. Here, it may be constituted such that the apparatus becoming the standby mode M14 does not return to the connection mode M11 if there is no process which may become some kind or another opportunity caused by a user operation or the like. Also, during a period when a communication is carried out between two apparatuses, the two apparatuses are to be set in the same mode basically. More specifically, at least the connection mode M11, the data transfer mode M12 and the low power consumption mode M13 are the modes which shift in synchronism with each other between the two apparatuses.

Here, in case of the present invention, as shown in FIG. 6, the normal mode M1 is set as a security mode when it is a state in which it communicated between the mobile telephone terminal apparatus 10 and the wireless key apparatus 50 in the low power consumption communication mode M13 and a warning mode is started by an opportunity that the communication mode shifts from the low power consumption communication mode M13 to the connection mode M11. The process with respect to the detail in which it is shifted from a warning mode to a function limitation mode will be described later on, but when the security mode becomes the function limitation mode M3, the function limitation mode M3 remains during a period when it is the connection mode M11, the data transfer mode M12 and the standby mode M14. It is constituted only in a case when it is shifted from the data transfer mode M12 to the low power consumption communication mode M13 such that the security mode is to return from the function limitation mode M3 to the normal mode M1.

Next, it will be explained a process in which the security mode is selected in each of the mobile telephone terminal apparatus 10 and the wireless key apparatus 50 with reference to FIG. 7. This security mode selection process is, for example, executed under the control of the control units 19 and 53 of the respective apparatuses.

First, it is judged whether or not the communication mode at present is in a low power consumption communication mode (step S1). Here, in a case when it is in a low power consumption communication mode, a state timer prepared in the control unit is reset (step S2). Then, the security mode is set to a normal mode (step S3) and a process as a normal mode (more specifically, a mode without limiting the function) is executed (step S4). It should be noted that the state timer is a timer counted up by passage of time.

Also, in a case when it is judged in step S1 that it is not in a low power consumption communication mode, it is judged whether or not the security mode just before (at present) is a normal mode (step S5). Here, in case of a normal mode, a state timer prepared in the control unit is made to start (step S6). Then, a start of a warning mode is set (step S7) and a warning operation as a warning mode is executed (step S8). It should be noted that in a case when it is constituted such that only one of the mobile telephone terminal apparatus 10 and the wireless key apparatus 50 carries out the warning operation, any process is not carried out particularly in the other apparatus during the warning mode.

Then, in a case when it is judged in step S5 that the security mode just before (at present) is not a normal mode, it is judged whether or not the counted value of the state timer activated in step S6 exceeds a value TH determined beforehand (step S9). It remains in the warning mode of step S8 until the counted value exceeds the predetermined value TH1 and in a case when the counted value exceeds the predetermined value TH1, it is made to change the security mode to a warning mode (step S10). It is designed such that the period when the counted value of the state timer exceeds the predetermined value TH1 after the count is started is a period, for example, of around several seconds to several ten seconds.

Figure 8:
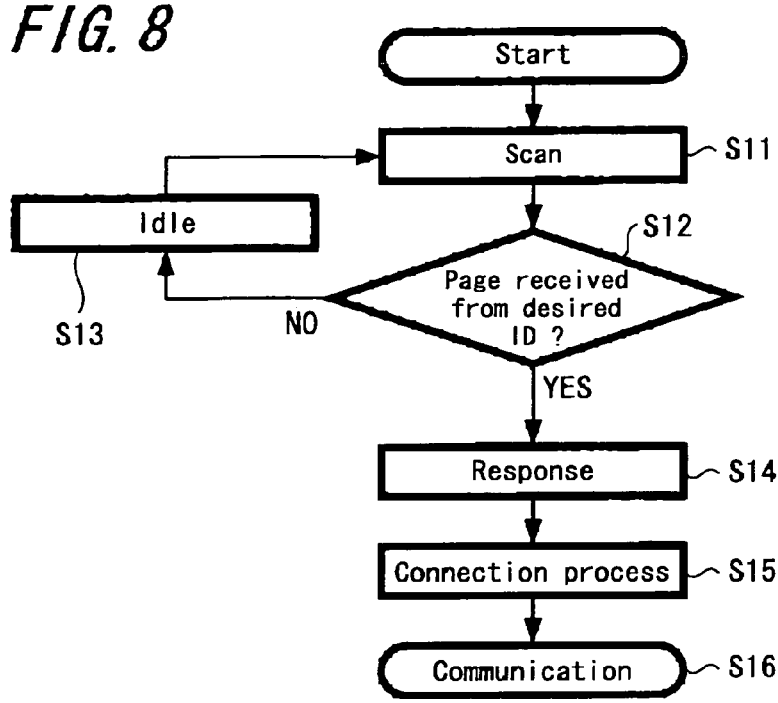
FIG. 8 is a flowchart showing a scanning process example according to one exemplified embodiment of the present invention.
Figure 9:
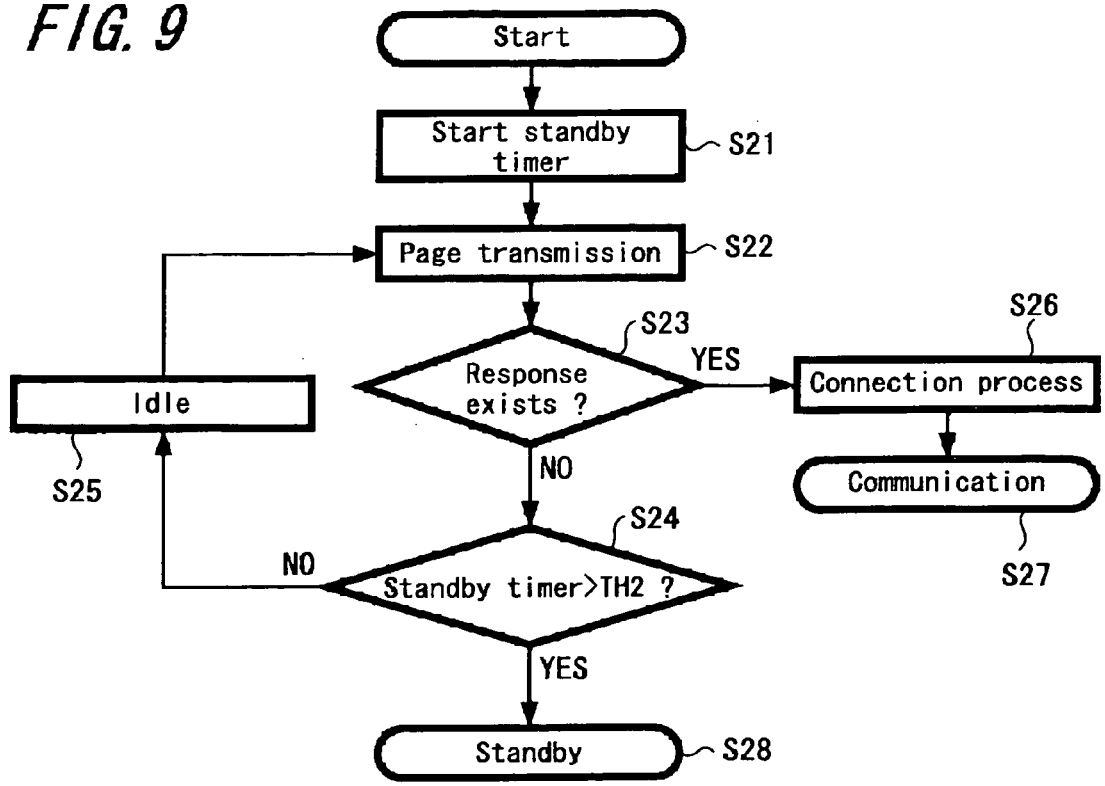
FIG. 9 is a flowchart showing a page transmission process example according to one exemplified embodiment of the present invention.

Next, it will be explained with reference to the drawings of FIG. 8 and subsequent thereto about a specific example of a communication state in each communication mode in each of the mobile telephone terminal apparatus 10 and the wireless key apparatus 50. First, it will be explained an example in which the mobile telephone terminal apparatus 10 and the wireless key apparatus 50 carry out the authentication process of a partner in the connection mode M11. In case of carrying out a wireless communication by Bluetooth system, one of the communication apparatus of the two apparatuses carrying out the communication becomes a master apparatus and the other communication apparatus becomes a slave apparatus. For the Bluetooth system, either one of the apparatuses may become a master or a slave, but in case of the present invention, it is to be set such that the wireless key apparatus 50 becomes a master and the mobile telephone terminal apparatus 10 becomes a slave.

The apparatus which became a slave (mobile telephone terminal apparatus 10 here) carries out a scan process for searching the master in a connection mode. FIG. 8 is a flowchart showing an operation example in this scan process. In the scan process, continuous reception is carried out for a constant period and a process for searching a signal from the master is carried out (step S11). It is judged in its scan process whether or not a signal (page signal) added with an ID number of the wireless key apparatus 50 which is a partner carrying out the security process was received (step S12). Here, in a case when signal added with the ID number of the wireless key apparatus 50 is not received, it is shifted to an idle process so as to wait for a constant period (step S13) and thereafter it returned to step S11 such that the scan process is repeated.

Then, in a case when it is judged in step S12 that the page signal added with the ID number of the wireless key apparatus 50 was received, a response signal with respect to that page signal is transmitted (step S14) and it is shifted to a communication state by carrying out a connection process with the master (more specifically, shifted to a data transfer mode M12) (step S16).

Next, FIG. 11 will be explained. The apparatus which became a master (here, wireless key apparatus 50) starts a standby timer when the connection mode starts (step S21). A page signal is transmitted by a determined channel for a predetermined period (step S22). At that time, for example, an ID number which was set for the own apparatus is added to the page signal and at the same time, the ID number of the communication partner is also added. Then, it is judged whether or not there is a response from the slave after the transmission of the page signal (step S23). In case of no response, it is judged whether or not the counted value of the standby timer exceeds a determined time period TH2 (step S24). In a case when the counted value of the standby timer does not exceed the determined time period TH2, it is shifted to an idle process and it waits for a constant period (step S25) and thereafter, it returns to step S22 and the transmission process of the page signal is repeated.

Then, in a case when it is judged in step S23 that there is a response from the slave, a connection process with the slave is performed and it is shifted to a communication state (more specifically, shifted to a data transfer mode) (step S27). Also, in a case when the counted value of the standby timer exceeds the determined time period TH2 in step S24, it becomes a standby state (step S28) and a process for attempting a connection with the slave here is discontinued.

Figures 10A, 10B:
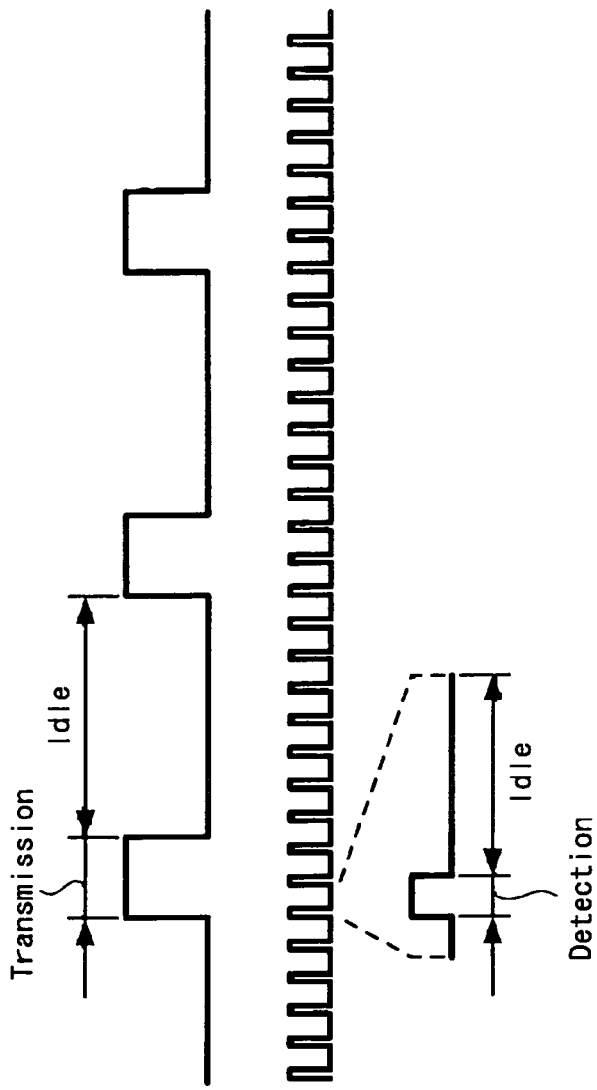
FIGS. 10A and 10B are timing diagrams showing an example of a process state of a page transmission and a scanning according to one exemplified embodiment of the present invention.
Figure 11:
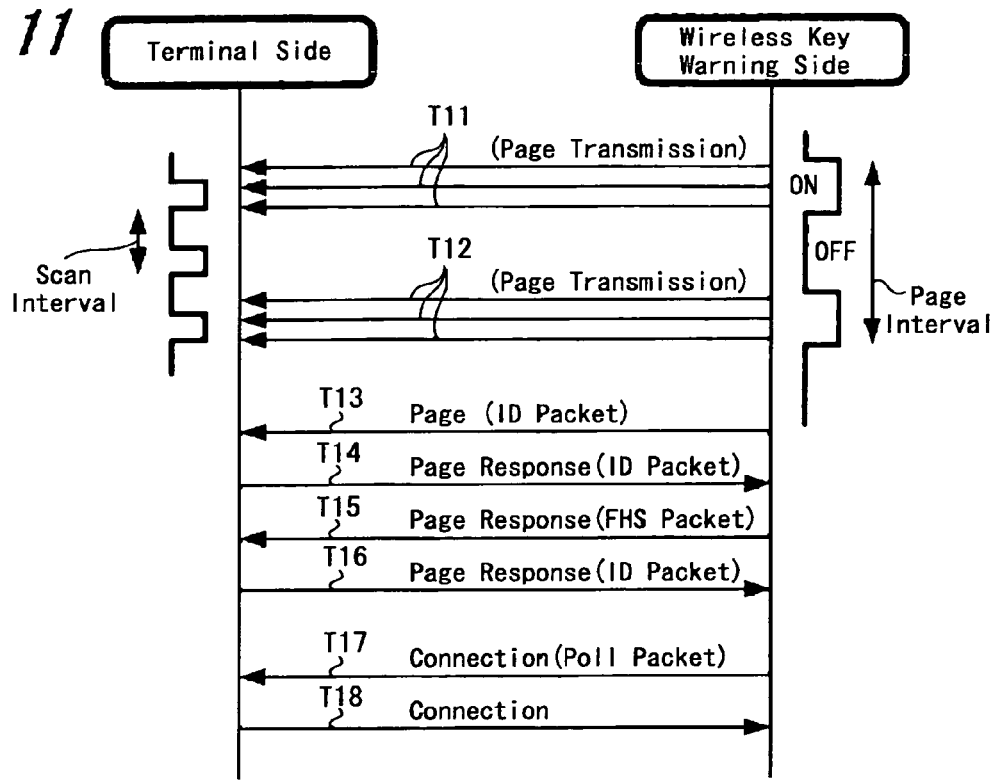
FIG. 11 is a sequence diagram showing an example of a connection state according to one exemplified embodiment of the present invention.

FIGS. 12A and 12B are diagrams showing an example of a communication state between the apparatus which became the master (wireless key apparatus 50) in which the process of the flowchart in FIG. 11 is carried out and the apparatus which became the master slave (mobile telephone terminal apparatus 10) in which the process of the flowchart in FIG. 10 is carried out. FIG. 12A shows a transmission timing of the page signal and an idle period of the master (wireless key apparatus 50). FIG. 12B shows a receiving (scan) timing and an idle period of the slave (mobile telephone terminal apparatus 10). As shown in FIGS. 12A and 12B, the idle period of the transmission side and the idle period of the receiving side are different from each other and it is constituted such that the page signal transmitted at any timings can be received on the receiving side.

FIG. 11 is a diagram showing the process of FIG. 10 by a sequence diagram. As shown in FIG. 11, the transmission of the page signal is carried out from the wireless key apparatus 50 intermittently (at timing T11, T12, T13). Here, if there is a response with respect to the page signal (at timing T14), mutual exchange of the response between the two apparatuses are further carried out (at timing T15, T16), thereafter mutual exchange of the connection signal performing the wireless connection is carried out (at timing T17, T18) and it is shifted to a data transfer mode.

Next, a process example in a case when the respective apparatuses of the present invention are shifted to the data transfer mode M12 will be explained with reference to a flowchart of FIG. 12. When it is shifted to a data transfer mode, an authentication process in a channel in which the data transfer is carried out is performed (step S31). Then, it is judged whether or not the authentication was completed correctly (step S32). In a case when the authentication process is not completed here, it returns to the connection mode M11.

Then, in a case when the connection process in step S32 is completed, a data transfer is carried out ordinarily, but in the security process of the present invention, the data transfer is not carried out and a process for shifting to a low power consumption mode M13 is carried out directly (step S33). Then, it is judged whether or not it can be shifted to a low power consumption mode (step S34). In case of a state in which it can be shifted to a low power consumption mode M13, it is set to a sniff state of a low power consumption mode M13. In a case when it cannot be shifted to a low power consumption mode, it returns to the connection mode M11.

Figure 12:
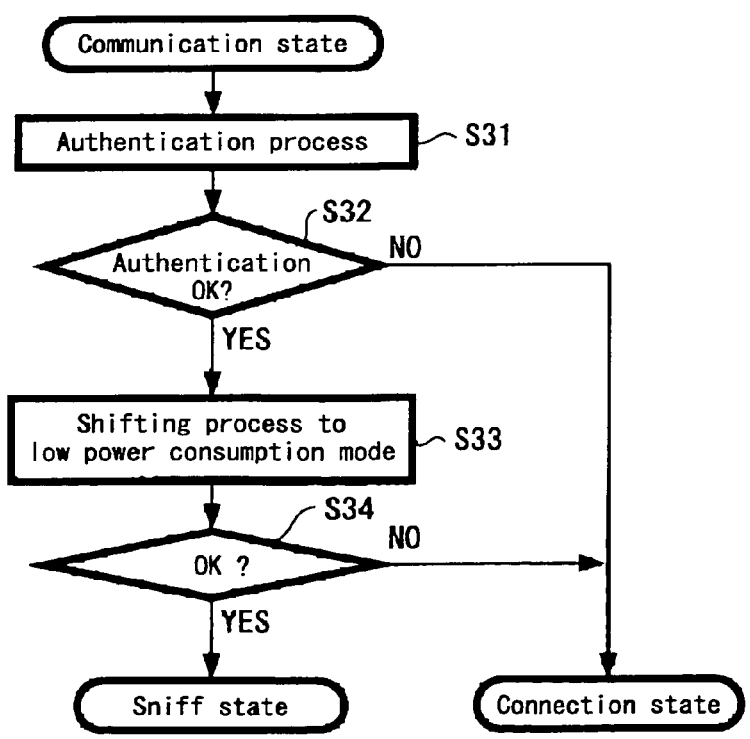
FIG. 12 is a flowchart showing a shifting process example for low power consumption according to one exemplified embodiment of the present invention.
Figure 13:
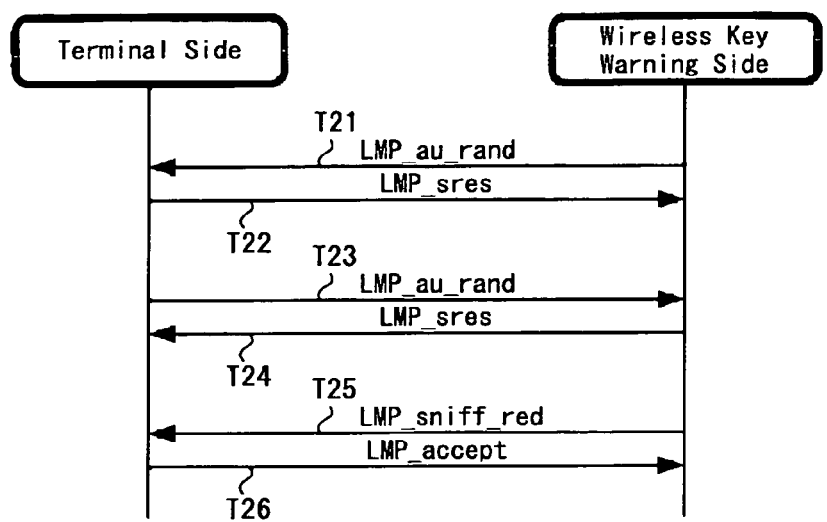
FIG. 13 is a sequence diagram showing a transmission example of a communication state message according to one exemplified embodiment of the present invention.

FIG. 13 is a sequence diagram showing an example of the communication state shown in the flowchart of FIG. 12. More specifically, packet transmission is carried out mutually in the data transfer mode M12 for performing authentication or the like (at timing T21, T22, T23, T24). Then, after the authentication is completed, data (sniff mode request) for shifting to a low power consumption mode is transmitted (at timing T25) from the master (wireless key apparatus 50) and its consent is received (at timing T26) such that both apparatuses are shifted to a low power consumption mode (sniff mode).

Figure 14:
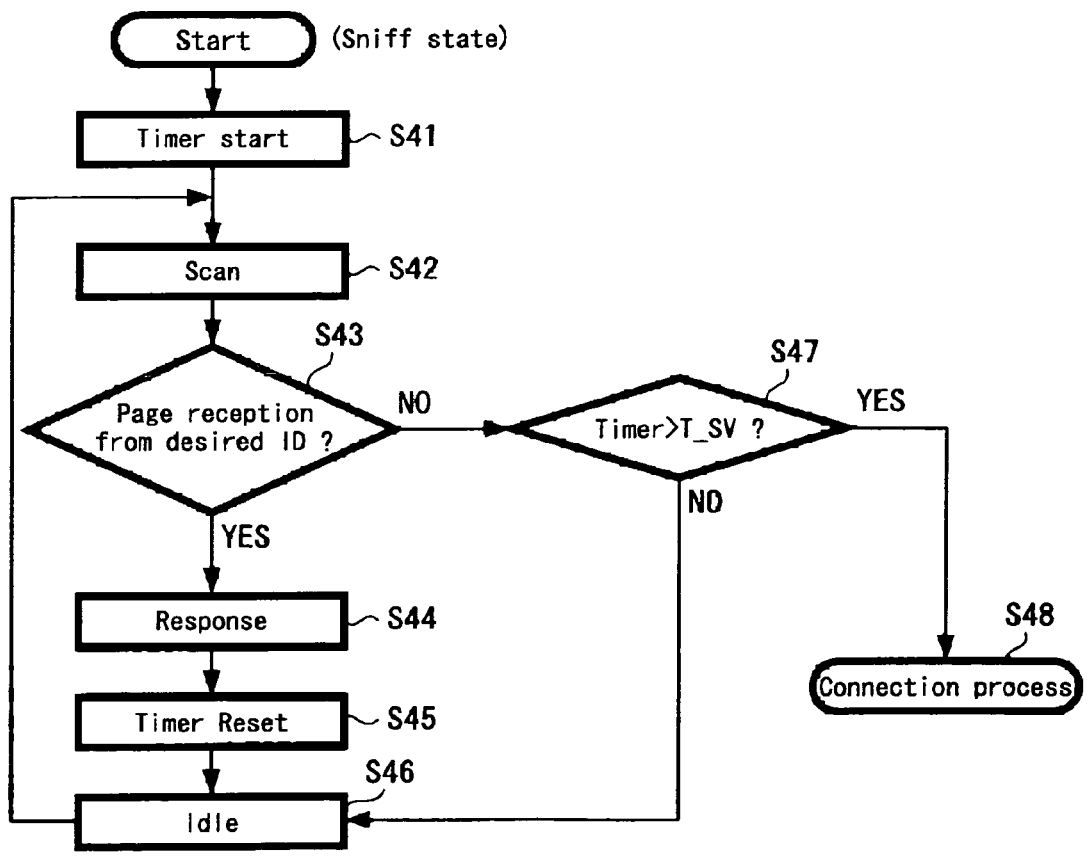
FIG. 14 is a flowchart showing a communication process example in a mobile terminal according to one exemplified embodiment of the present invention.

FIG. 14 is a flowchart showing a process example in a low power consumption mode M13 (sniff mode) relating to the slave (mobile telephone terminal apparatus 10). The process will be explained. When it becomes a sniff mode, first, a timer is started (step S41) and a scan process for receiving a signal from the master is carried out (step S42). It is judged subsequently to the scan process whether or not a signal (page signal) added with the ID number of the wireless key apparatus 50 which is a partner carrying out a security process was received (step S43). Here, in a case when a signal added with the ID number of the wireless key apparatus 50 is received, a response signal with respect to the page signal is transmitted (step S44). Then, the timer started in step S41 is reset (step S45) and it is shifted to an idle period (step S46). When an idle period of a constant period elapses, it returns to the scan process in step S42. Here, in case of the present invention, it is constituted such that the idle period in step S46 (period when communication is not carried out) is set as a relatively longer period and at the same time, it is constituted such that it is synchronized with the idle period on the master side.

On the other hand, in a case when it is judged in step S43 that a signal added with the ID number of the wireless key apparatus 50 is not received, it is judged whether or not the timer started in step S41 exceeded a predetermined value T_SV (step S47). Then, in a case when it does not exceed the predetermined value T_SV, the flow is shifted to the idle process of step S46. Then, in a case when step S47 it is judged it exceeds the predetermined value T_SV, the communication mode is changed to a connection mode M11 (step S48). The transmission power of the transmission amplifier may be changed to be higher when the communication mode is changed to a connection mode.

Figure 15:
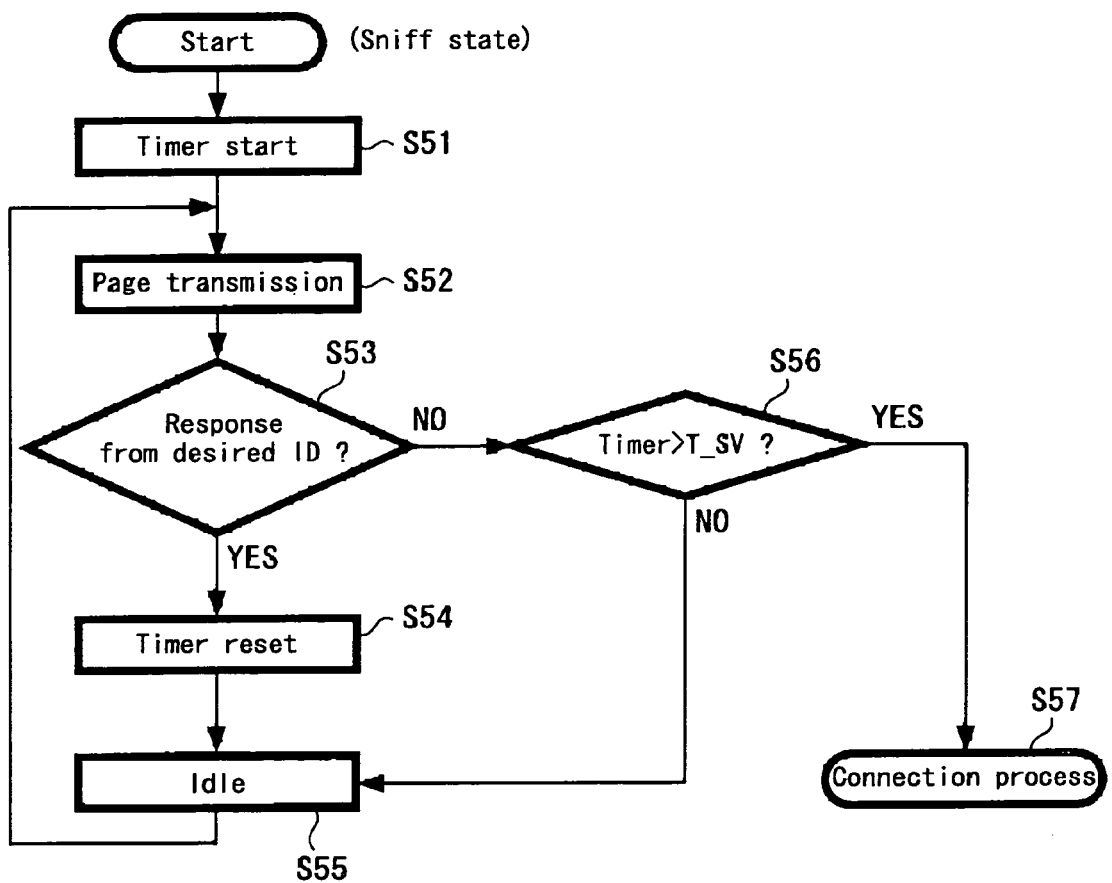
FIG. 15 is a flowchart showing a communication process example in a wireless key apparatus according to one exemplified embodiment of the present invention.

FIG. 15 is a flowchart showing a process example in the master (wireless key apparatus 50) with respect to the low power consumption mode (sniff mode). Its process will be explained. A first timer is started when it becomes a sniff mode (step S51). Then, a process for transmitting a page signal for a predetermined period is carried out (step S52). After the transmission of this page signal, it is judged whether or not a response from a partner (mobile telephone terminal apparatus 10) which carries out a security process was received (step S53). Here, in a case when the response signal is receive, the timer started in step S51 is to be reset (step S54). Then, the flow is shifted to the idle period (step S55). When an idle period of a constant period elapses, the flow returns to the page transmission process of step S52. Here, in case of the present invention, it is constituted such the idle period (period in which the communication is not carried out) in step S55 is to be set as a relatively long period and at the same time is to be synchronized with the idle period on the slave side.

On the other hand, in a case when it is judged in step S53 that a response from the mobile telephone terminal apparatus 10 is not received, it is judged whether or not the timer started in step S51 exceeded a predetermined value T_SV (step S56). In a case when it does not exceed the predetermined value T_SV, it is shifted to the idle process of step S55. Then, in a case when it is judged in step S56 that the predetermined value T_SV is exceeded, the communication mode is changed to a connection mode M11 (step S57). When the communication mode is changed to a connection mode M11, the transmission power of the transmission amplifier may be changed to be high.

Figure 16:
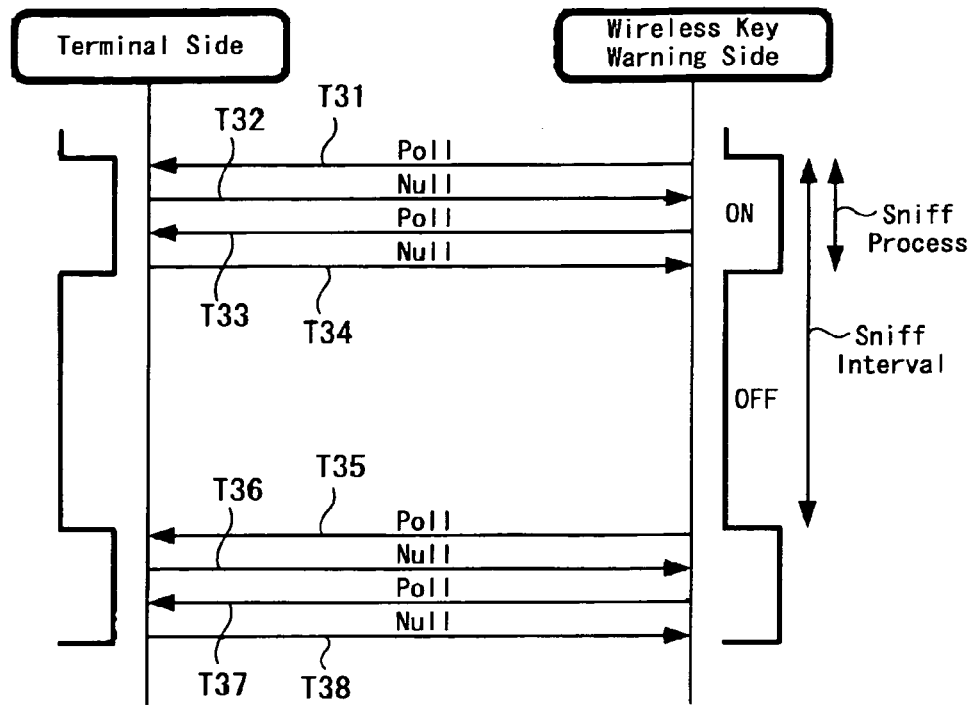
FIG. 16 is a sequence diagram showing a transmission example in a sniff state according to one exemplified embodiment of the present invention.

FIG. 16 is a sequence diagram showing communication timings in the both apparatuses in connection with a low power consumption mode (sniff mode) M13. As shown in FIG. 16, the timing at which the sniff process (portion describes as ON) is carried out in the master and the timing at which the sniff process is carried out in the slave approximately coincide with each other. More specifically, the timings (T31, T33, T35, T37) at which polling packets are transmitted from the master and the periods when the reception thereof are carried out in the slave approximately coincide with each other. Also, respective polling packets are received by the slave and with respect to the responses thereof (at timing T32, T34, T36, T38), they are received on the master side. Owing to the fact that an intermittent bidirectional communication is carried out in this manner, a low power consumption mode M13 is maintained and a wireless connection state between the master and the slave is maintained.

Figure 17:
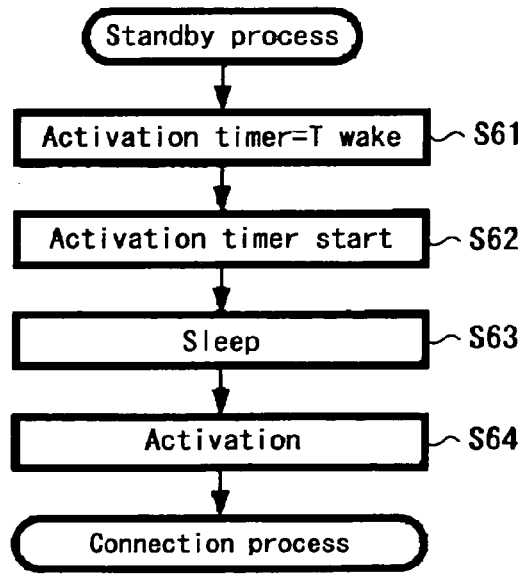
FIG. 17 is a flowchart showing a process example in a standby state according to one exemplified embodiment of the present invention.

It should be noted in a case when the communication mode becomes a standby state that, for example, a process shown in a flowchart of FIG. 17 is carried out. More specifically, when it becomes a standby state, an activation period is set for an activation timer (step S61). Then, the activation timer is started (step S62). Then, the communication circuit is made to be in a sleep state (step S63). Thereafter, when the period set by the activate timer elapses, the communication circuit is activated (step S64) and the flow is shifted to the connection mode M11 so as to execute a connection process.

Owing to a fact that the processes explained so far are executed, in a case when the mobile telephone terminal apparatus 10 and the wireless key apparatus 50 can wireless-communicate favorably in an adjacent state, the mobile telephone terminal apparatus 10 and the wireless key apparatus 50 are maintained in a wireless-connected state using a low power consumption mode. In this wireless-connected state using the low power consumption mode, a data transfer which becomes a so-called payload is not carried out and a signal for maintaining the wireless connection is only transmitted and received intermittent. In this case, by selecting the idle period properly, it is possible to carry out a communication with very low power consumption. Therefore, it is possible to lower the power consumption caused by carrying out the security process of the present invention and it is possible to make the battery duration periods of both the mobile telephone terminal apparatus 10 and the wireless key apparatus 50 be a longer period. In particular, there is a big effect on a wireless key apparatus which is desired to be constituted in a small size as much as possible.

Also, with respect to the mobile telephone terminal apparatus 10, a security process was carried out by applying a short distance wireless communication system of the Bluetooth system which has a great number of examples already mounted on mobile telephone terminals, so that the security process of the present invention can be realized only by slightly changing a control constitution or the like of a mobile telephone terminal provided with a short distance wireless communication circuit of an existing Bluetooth system and a favorable security function is realized easily.

Figure 18:
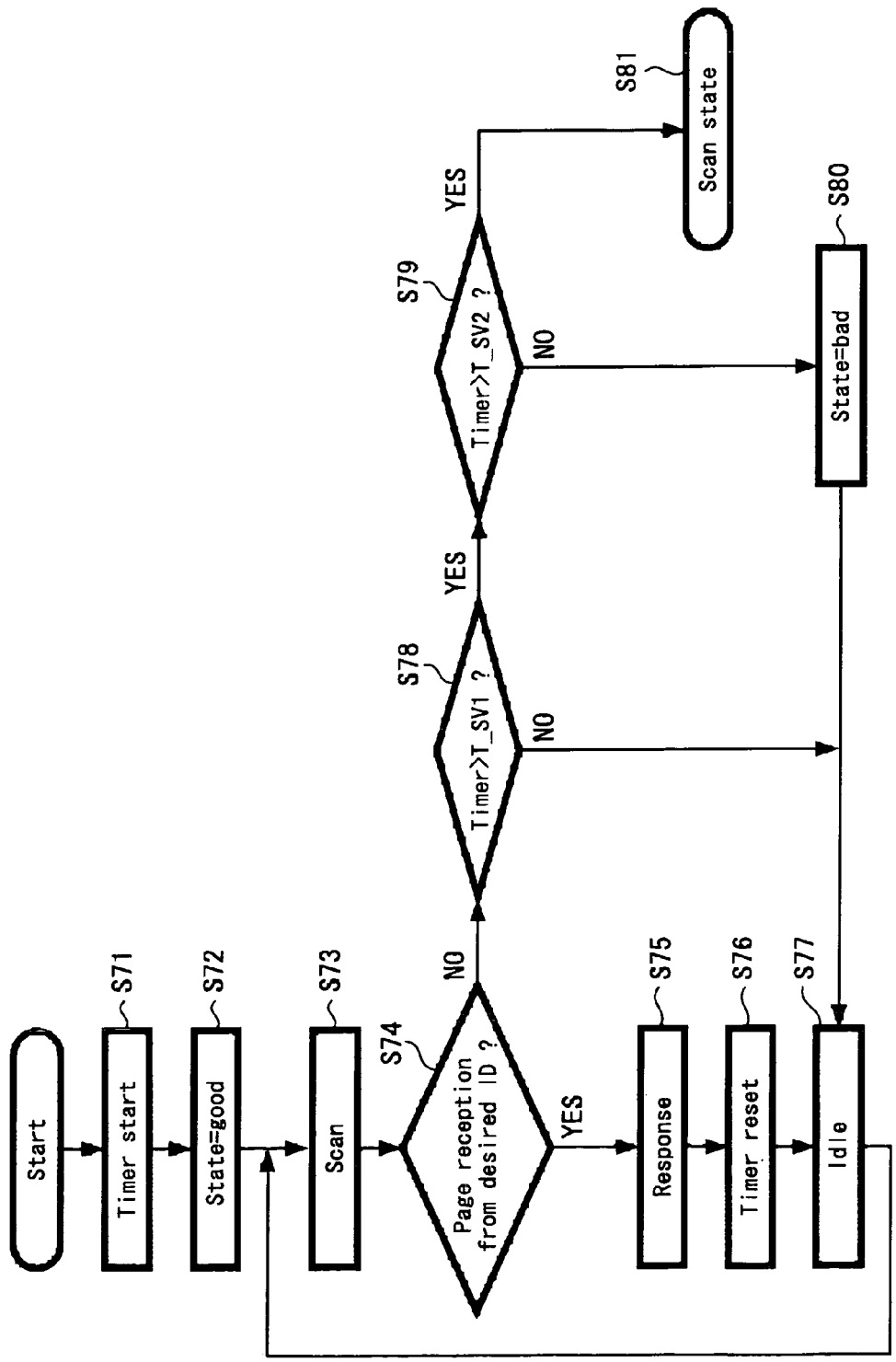
FIG. 18 is a flowchart showing a mode selection process example on a terminal side according to another exemplified embodiment of the present invention.
Figure 19:
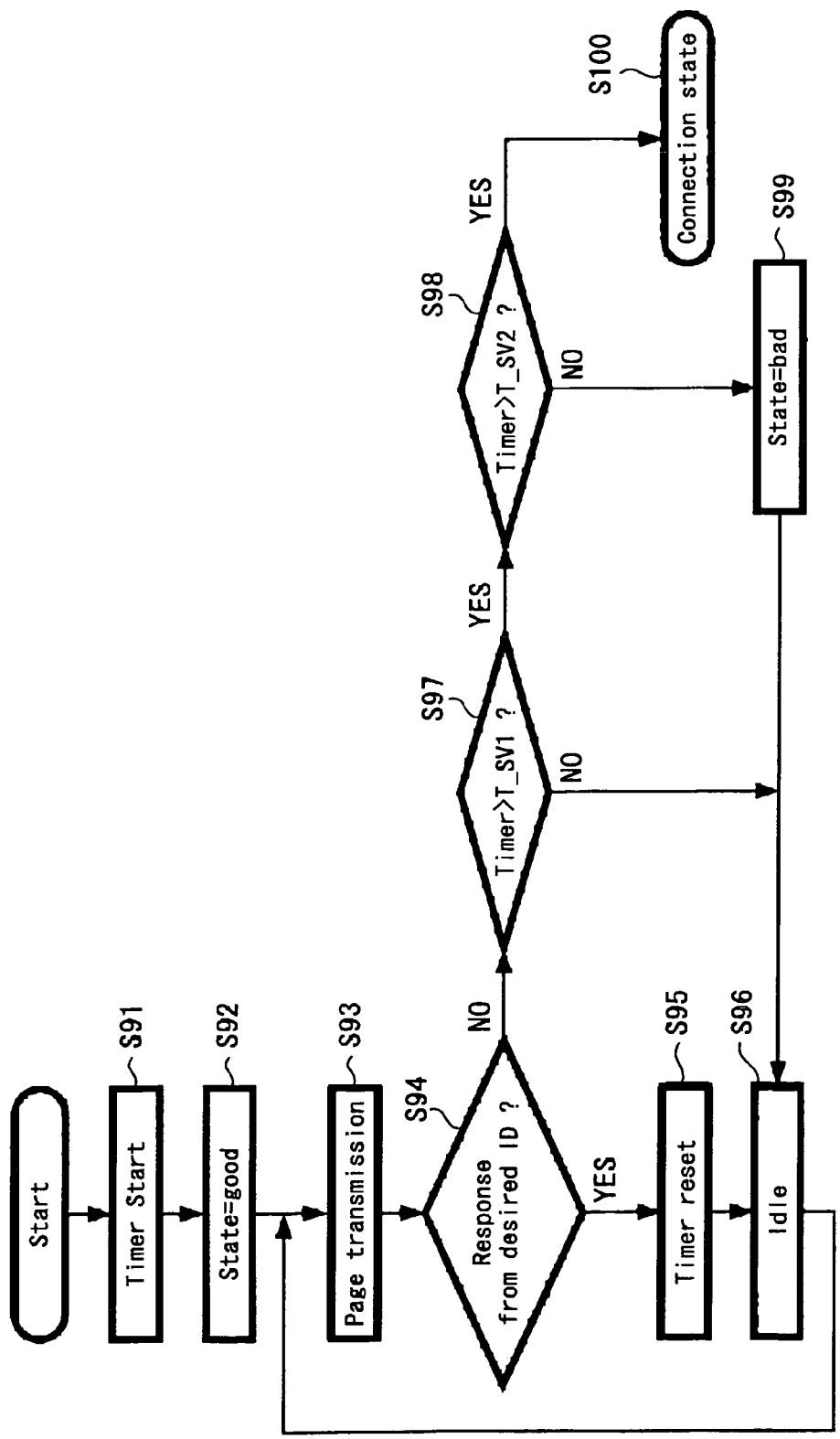
FIG. 19 is a flowchart showing a mode selection process example on a wireless key apparatus side according to another exemplified embodiment of the present invention.
Figure 20:
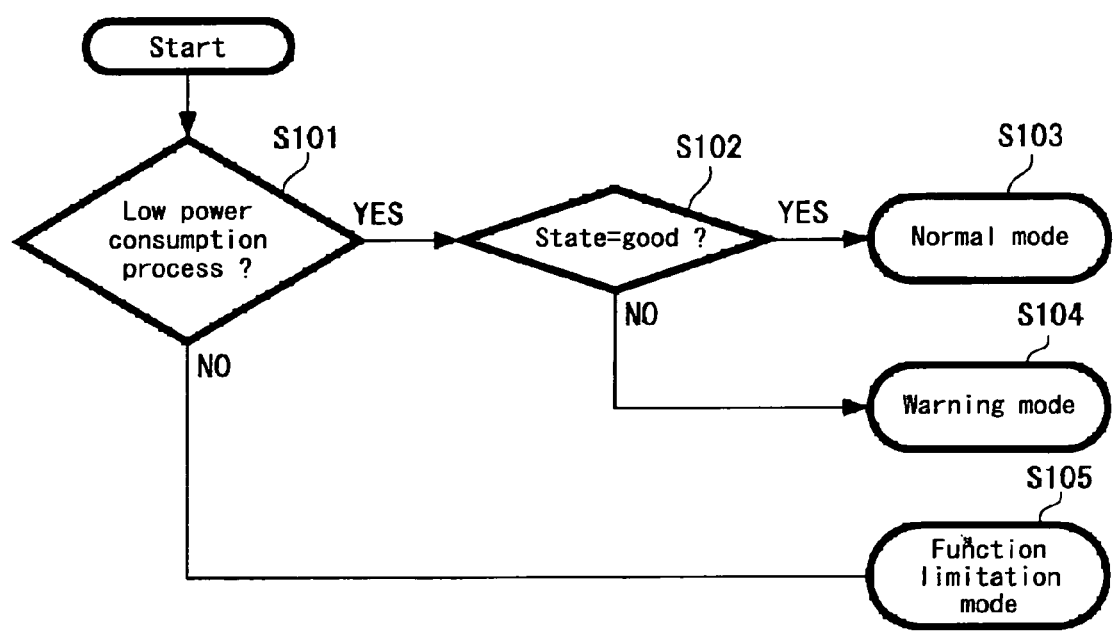
FIG. 20 is a flowchart showing an example of a mode selection state in case of FIGS. 21 and 22.

Here, in the exemplified embodiments mentioned above, it was constituted such that shifting from a low power consumption mode to a connection mode is processed (more specifically, processed according to the connection/cutoff of the communication or the signal strength) simply by whether or not it is a state in which a wireless communication is possible between two apparatuses, but it may be constituted such that it is judged by a detection state of packets from the partner. FIGS. 18 to 20 are diagrams showing a process example in a case thereof.

First, a process example in a slave (mobile telephone terminal apparatus 10) is shown in a flowchart of FIG. 18. When the mobile telephone terminal apparatus 10 becomes in a low power consumption mode (sniff mode), a timer is started (step S71). Then, "good" is set as a communicate state (step S72). Then, a scan process for receiving a signal from a master is carried out (step S73). It is judged in its scan process whether or not a signal (page signal) added with an ID number the wireless key apparatus 50 which is a partner carrying out a security process was received (step S74). Here, in a case when a signal added with the ID number of the wireless key apparatus 50 was received, a response signal with respect to that page signal is transmitted (step S75) and the timer started in step S71 is reset (step S76). Then, the flow is shifted to an idle period (step S77). When the idle period of a constant period elapses, the flow returns to the scan process of step S73. This idle period is synchronized the idle period on the master side.

In a case when it is judged in step S74 that the signal added with the ID number of the wireless key apparatus 50 cannot be received, it is judged whether or not the timer started in step S71 exceeded a first predetermined value T_SV1 (step S78). In a case when the predetermined value T_SV1 is not exceeded, it is shifted to the idle process of step S77. Then, in a case when it is judged in step S78 that the predetermined value T_SV1 was exceeded, the timer further judges whether or not a second predetermined value T_SV2 was exceeded (step S79). It should be noted that the second predetermined value T_SV2 is a period longer than that of the first predetermined value T_SV1. Here, in a case when it is judged the second predetermined value T_SV2 is not exceeded, "bad" is set as a communicate state (step S80), it is shifted to the idle process of step S77. In a case when it is judged in step S79 that the second predetermined value T_SV2 was exceeded, the communication mode is changed to a connection mode (step S81).

Next, a process example in a master (wireless key apparatus 50) here will be explained with reference to a flowchart of FIG. 19. When it becomes a sniff mode, a first timer is started (step S91). Then, "good" is set as a communicate state (step S92). Then, a process for transmitting a page signal for a predetermined period is carried out (step S93). After the transmission of this page signal, it is judged whether or not a response from the partner (mobile telephone terminal apparatus 10) which carries out a security process was received (step S94). Here, in a case when a response signal was received, the timer started in step S91 is reset (step S95) and the flow is shifted to an idle period (step S96). When an idle period of a constant period elapses, the flow returns to the scan process of step S93. This idle period is synchronized with the idle period on the slave side.

Then, in a case when it is judged in step S94 that a response from the mobile telephone terminal apparatus 10 cannot be received, it is judged whether or not the timer started in step S91 exceeded a first predetermined value T_SV1 (step S97). In a case when the predetermined value T_SV1 is not exceeded, the flow is shifted to an idle process of step S96. Then, in a case when it is judged in step S97 that the predetermined value T_SV1 was exceeded, it is further judged whether or not the timer exceeded a second predetermined value T_SV2 (step S98). It should be noted that the second predetermined value T_SV2 is a period longer than that of the first predetermined value T_SV1. Here, in a case when it is judged that the second predetermined value T_SV2 was not exceeded, "bad" as a communication state is set (step S99). Then the flow is shifted to an idle process of step S96. In a case when it is judged in step S98 that the second predetermined value T_SV2 was exceeded, the communication mode is changed to a connection mode (step S100).

Then, in case of being processed as shown in FIGS. 18 and 19, the security mode selection is to be set according to the judgment as shown in FIG. 20. More specifically, it is judged first whether or not the communication mode is a low power consumption mode (step S101). In case of a low power consumption mode, it is judged whether or not the communicate state set by the flowchart of FIG. 18 and FIG. 19 is "good" (step S102). Here, in a case when the communicate state is "good", the security mode is made to be a normal mode M11 (step S103). Then, in a case when the communicate state is "bad" in step S102, the security mode is made to be a warning mode M2 (step S104). Further, in a case when it is judged in step S101 that it is not a low power consumption mode, the security mode is made to be a function limitation mode M3 (step S105).

By being process as shown in the flowchart of FIG. 20, it becomes a warning mode in a state in which possibility of shifting from the low power consumption mode to the connection mode became high and it is possible to carry out a warning favorably.

The wireless key apparatus 50 explained so far was constituted as an apparatus for exclusive use which carries out only the security function, but it may be constituted such that it is to be mounted on an apparatus having other function. For example, it may be constituted such that a wireless key apparatus is to be mounted on a head set for carrying out a wireless communication of Bluetooth system with the mobile telephone terminal apparatus 10 and carrying out a so-called hands-free telephone call. Hereinafter, it will be explained with respect to a head set with a wireless key in which such a wireless key function and a head set function are integrated.

Figure 21:
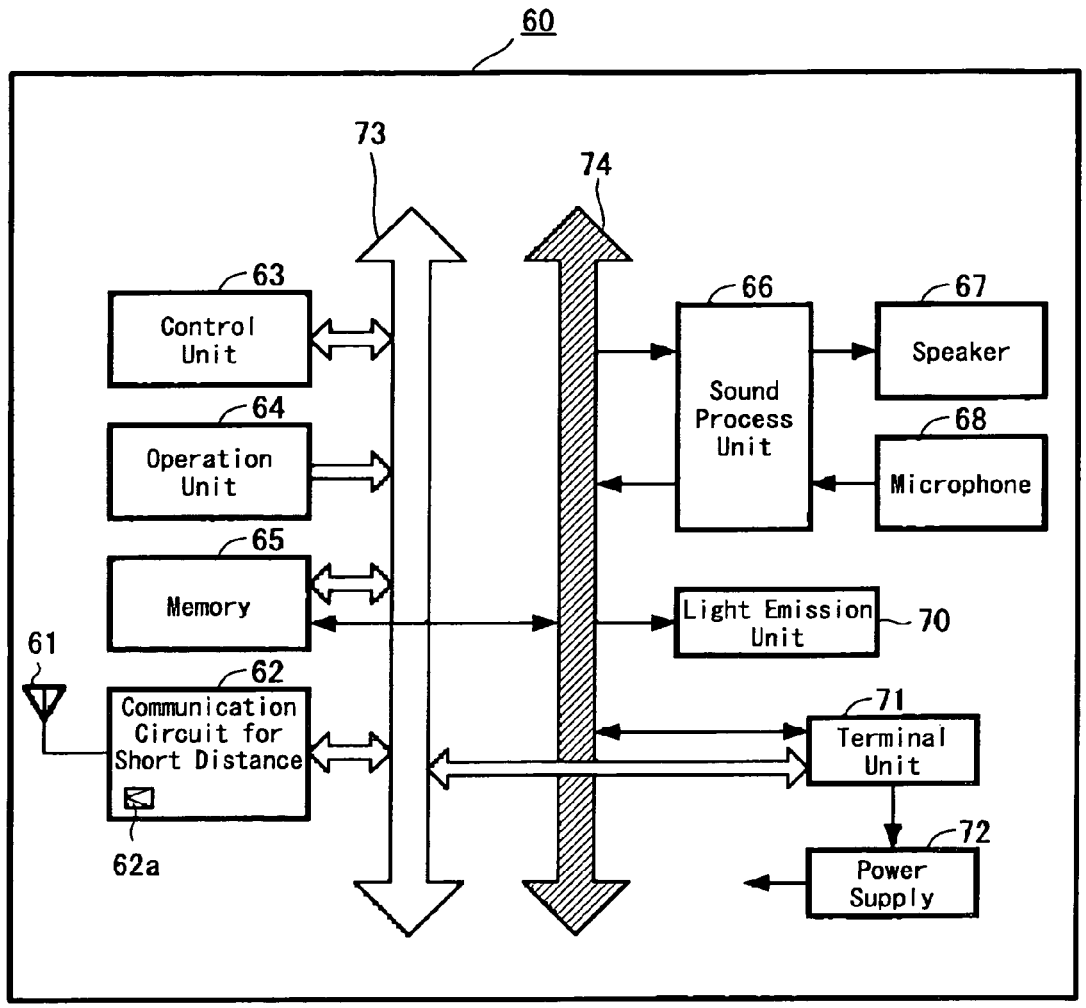
FIG. 21 is a block diagram showing a modified example of a wireless key apparatus (example integrated with a head set) according to a still another exemplified embodiment of the present invention.

FIG. 21 is a diagram showing a constitutional example of a head set with this wireless key. A head set 60 with a wireless key according to the present invention is provided with a communication circuit 62 for short distance wireless communication. This communication circuit 62 carries out a wireless communication with a partner in a relatively narrow region of, for example, around several meters and at the maximum hundred meters by way of a connection antenna 61. Here, Bluetooth system which is the same system as the short distance wireless communication system provided on the side of the mobile telephone terminal apparatus 10 is applied also to the communication circuit 62 of the head set with the wireless key. The partner carrying out a wireless communication by the communication circuit 62 is limited to the specific one of the mobile telephone terminal apparatus 10 which was registered. For that purpose, for example, identification ID of the apparatus or the like is registered beforehand. However, it may be constituted when using only the head set such that there is no limitation for the partner whom the communication circuit 62 carries out a wireless communication.

With respect to the wireless communication in the communication circuit 62, it is executed under a control of the control unit 63. It is constituted such that the communication circuit 62 for short distance wireless communication connected with the antenna 61 is to carry out a wireless communication with the mobile telephone terminal apparatus 10 under a control of the control unit 19. When a communication for a telephone call is carried out in the communication circuit 62, an arriving call from the mobile telephone terminal apparatus 10 or a leaving call operation by a user is detected in a control unit 63, sound data received from the mobile telephone terminal apparatus 10 are supplied to a sound data processing unit 66 so as to perform a receiving process of the sound data and thereafter, they are supplied to a speaker 67 to be outputted and also, sound data for transmission which are picked up by a microphone 68 and processed in the sound data processing unit 66 are supplied to the communication circuit 62 to be transmitted. In this case, it is constituted such that transmission power for the transmission amplifier 62a which amplifies the transmission signal in the communication circuit 62 is to be set under a control of the control unit 63 or the like.

When a communication for the head set (more specifically, sound data communication for a telephone call) is carried out in the communication circuit 62, received sound data are supplied to a sound data processing unit 66 and a receiving process of the sound data is performed. Thereafter, they are supplied to a speaker 67 and outputted. Also, sound data picked up by a microphone 68 are processed in the sound data processing unit 66 so as to become sound data for transmission. Then, the sound data for transmission are supplied to the communication circuit 62 and transmitted. Also, the speaker 67 is used also as warning means which becomes necessary for the security function and notification means for notifying a receiving signal of the mobile telephone terminal apparatus 10 or the like. Alternatively, it may be constituted such that a dedicated speaker for generating a warning sound is added separately.

In addition, the head set with the wireless key 60 of the present invention is provided with an operation unit 64 constituted by operation keys or the like, a memory 65 and a light emitting unit 70. The light emitting unit 70 is used as warning means relating to the security function and at the same time used also as display means of operation state or as notification means for notifying a telephone receiving signal or the like on the occasion when it is functioned as a head set. These respective units in the head set 60 can carry out exchange of control data by way of a control line 73. Further, the respective units can carry out exchange of sound data or the like by way of a data line 74.

Also, the head set with the wireless key 60 of the present invention is provided with a terminal unit 71 and it is constituted such that the mobile telephone terminal apparatus 10 can be connected directly by means of this terminal 71. When connected with the mobile telephone terminal apparatus 10 directly, it is constituted such that the control unit 63 in the head set with the wireless key 60 carries out a data transfer directly with the control unit 19 in the mobile telephone terminal apparatus 10 and a direct sound data transfer or a security process is to be carried out without a short distance wireless communication. Also, in a case when remaining charge amount of a secondary battery installed in a power supply circuit 72 in the head set with the wireless key 60 is small, it is possible to charge the secondary battery in the power supply circuit 72 by an power supplied from the side of the mobile telephone terminal apparatus 10.

Figure 22:
FIG. 22 is an explanatory diagram showing a usage example of FIG. 21 example.
Figure 23:
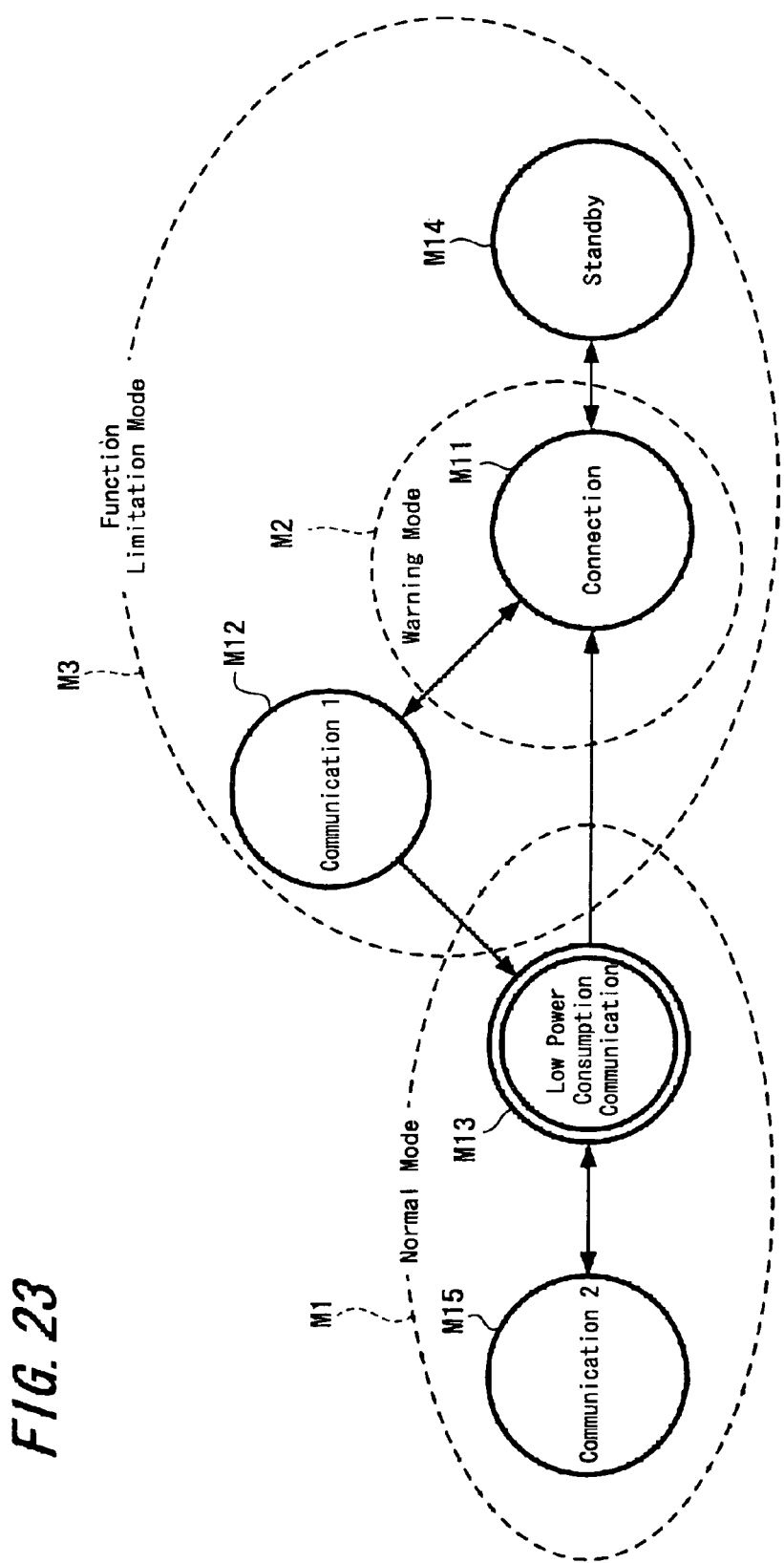
FIG. 23 is an explanatory diagram showing a transition example of a security mode by a communication mode in a modified example of a wireless key apparatus according to a still another exemplified embodiment of the present invention.

In a case when such a head set with a wireless key 60 is prepared, as shown, for example, in FIG. 22, a user putting on the head set with the wireless key 60 can carry out a so-called hands-free telephone call depending on a fact that the mobile telephone terminal apparatus 10 which remains inside a bag or the like and the head set with the wireless key 60 carries out a wireless communication. Further, with respect to a function as a wireless key apparatus, a warning and a function limitation of the mobile telephone terminal apparatus 10 are executed according to position relationship (distance) between the head set with the wireless key 60 and the mobile telephone terminal apparatus 10. More specifically, in a case when the mobile telephone terminal apparatus 10 goes away from the head set with the wireless key 60 to a certain degree of distance, the head set with the wireless key 60 or the mobile telephone terminal apparatus 10 (alternatively, both sides) carries out a warning operation (warning mode which will be described later on). Then, if the user stays away from the mobile telephone terminal apparatus 10 in the state in which this warning operation was carried out, it becomes a state in which the function of the mobile telephone terminal apparatus 10 is limited (function limitation mode will be described later on).

Next, it will be explained with respect to a process example in a case when a security process is carried out by preparing the mobile telephone terminal apparatus 10 and the wireless key apparatus 50 of such a constitute. A mode transition in a case when the head set 60 with a wireless key is used is also approximately similar as that shown in FIG. 6 fundamentally, but there exists newly a mode of a communication 2. The connection mode M11 is a state in which an inquiry to the partner apparatus or a signal detection is carried out, the communication 1 corresponds to the data transfer M12 and is a state in which mutual authentications are carried out, the low power consumption communication mode M13 is a state in which a waiting and receiving process as a head set is carried out, and a telephone leaving call from the head set with the wireless key 60 or a calling from the mobile telephone terminal apparatus 10 is possible. Also, the communication 2 is a mode newly provided according to the present invention and is a state during a telephone call as a head set. Then, a new normal mode M1 is formed by the low power consumption communication mode M13 and the communication 2 (M15).

Figure 24:
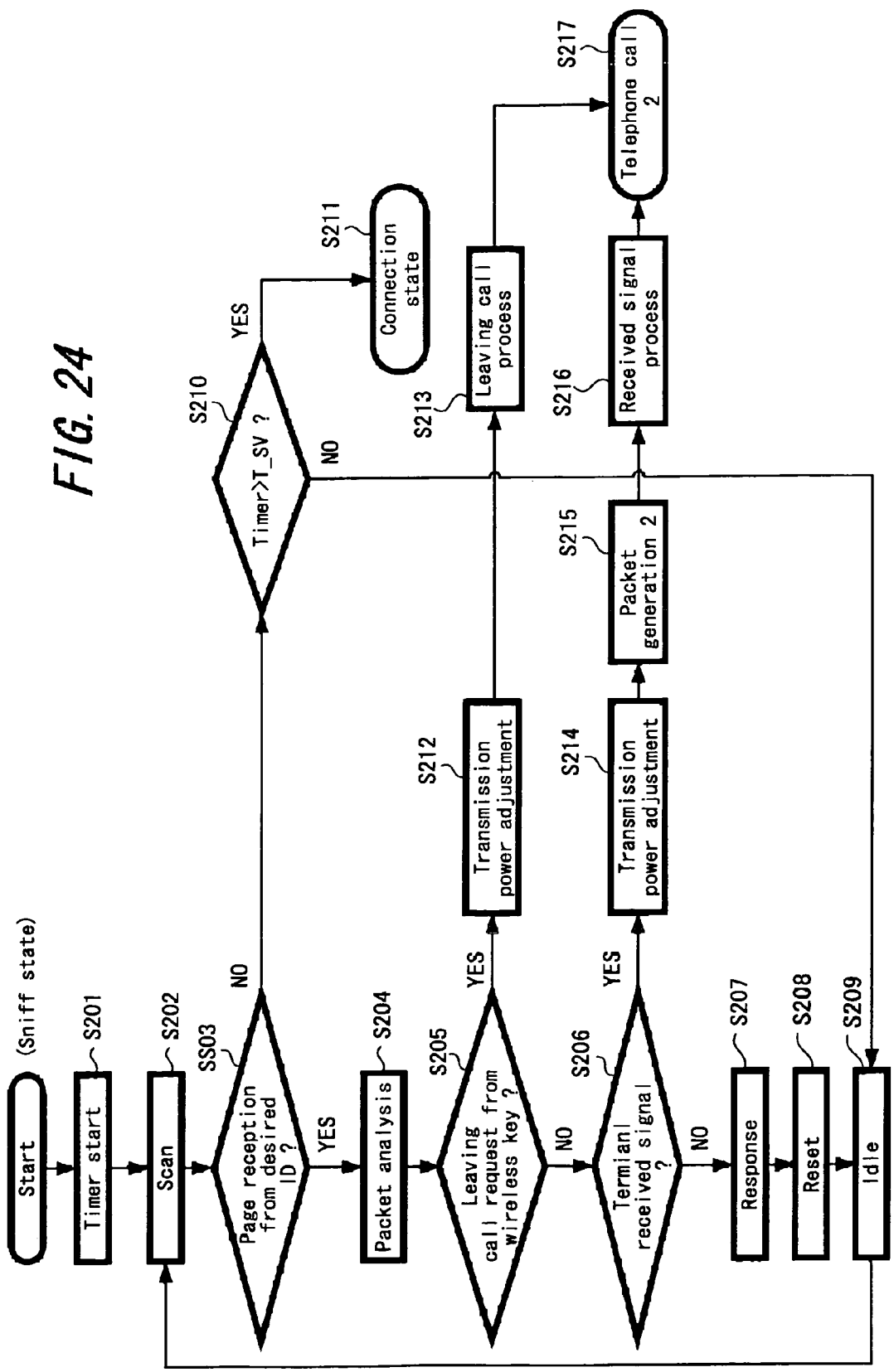
FIG. 24 is a flowchart showing a communication process example on a mobile terminal side according to a still another exemplified embodiment of the present invention.

FIG. 24 is a flowchart showing a process example in a low power consumption mode M13 (sniff mode) relating to the slave (mobile telephone terminal apparatus 10) The process will be explained. When it becomes a sniff mode, first, a timer is started (step S201) and a scan process for receiving a signal from the master is carried out (step S202). It is judged subsequently to the scan process whether or not a signal (page signal) added with the ID number of the head set with the wireless key apparatus 60 which is a partner carrying out a security process was received (step S203). Here, in a case when a signal added with the ID number of the head set with the wireless key apparatus 60 is received, the packet transmitted cyclically is analyzed (step S204) and subsequent processes are carried out in response to its content.

First, it is judged whether or not the content of the packet is a leaving call request from the head set 60 with a wireless key (step S205). In a case when it is not a leaving call request, it is judged next whether or not it is a received signal of the mobile telephone terminal (step S206). Here, in a case when it is not a received signal, a response signal (Null Packet) for a link confirmation with respect to the page signal is transmitted (step S207), the timer started in step S201 is reset (step S208) and the flow is shifted to an idle period (step S209). When the idle period of a constant period elapses, the flow returns to the scan process of step S202. Here, in case of the present invention, it is constituted such that the idle period in step S209 (period when communication is not carried out) is set as a relatively longer period and at the same time, it is constituted such that it is synchronized with the idle period on the master side.

On the other hand, in a case when it is judged in step S203 that a signal added with the ID number of the head set 60 with a wireless key is not received, it is judged whether or not the timer started in step S201 exceeded a predetermined value T_SV (step S210). Then, in a case when it does not exceed the predetermined value T_SV, the flow is shifted to the idle process of step S209. Then, in a case when step S210 it is judged it exceeds the predetermined value T_SV, the communication mode is changed to a connection mode M11 (step S211).

Also, in a case when it is judged in step S205 that there is a leaving call request from the head set 60 with a wireless key, the transmission power is changed over to a head set mode (transmission power increase or power control mode) so as to maintain the communication reliably (step S212). The head set mode means that it is made to be in a state in which the head set function can be used. Then, a leaving call process is carried out in response to the content appointed by the head set 60 with a wireless key (step S213) and the flow is shifted to a state of the telephone call 2 (step S217).

Also, in a case when there is a received signal at the terminal in step S206, the transmission power is changed over to a head set mode (transmission power increase or power control mode) so as to maintain the communication reliably (step S214), packets including information of a calling sound generation request or the like with respect to the head set 60 with a wireless key and the packets are transmitted (step S215). Then, a response from the head set 60 with a wireless key is waited for, and when a receiving signal process is carried out by the user (step S216), the fact is notified to the mobile telephone terminal apparatus 10 and the flow is shifted to a state of the communication 2 (step S217).

Figure 25:
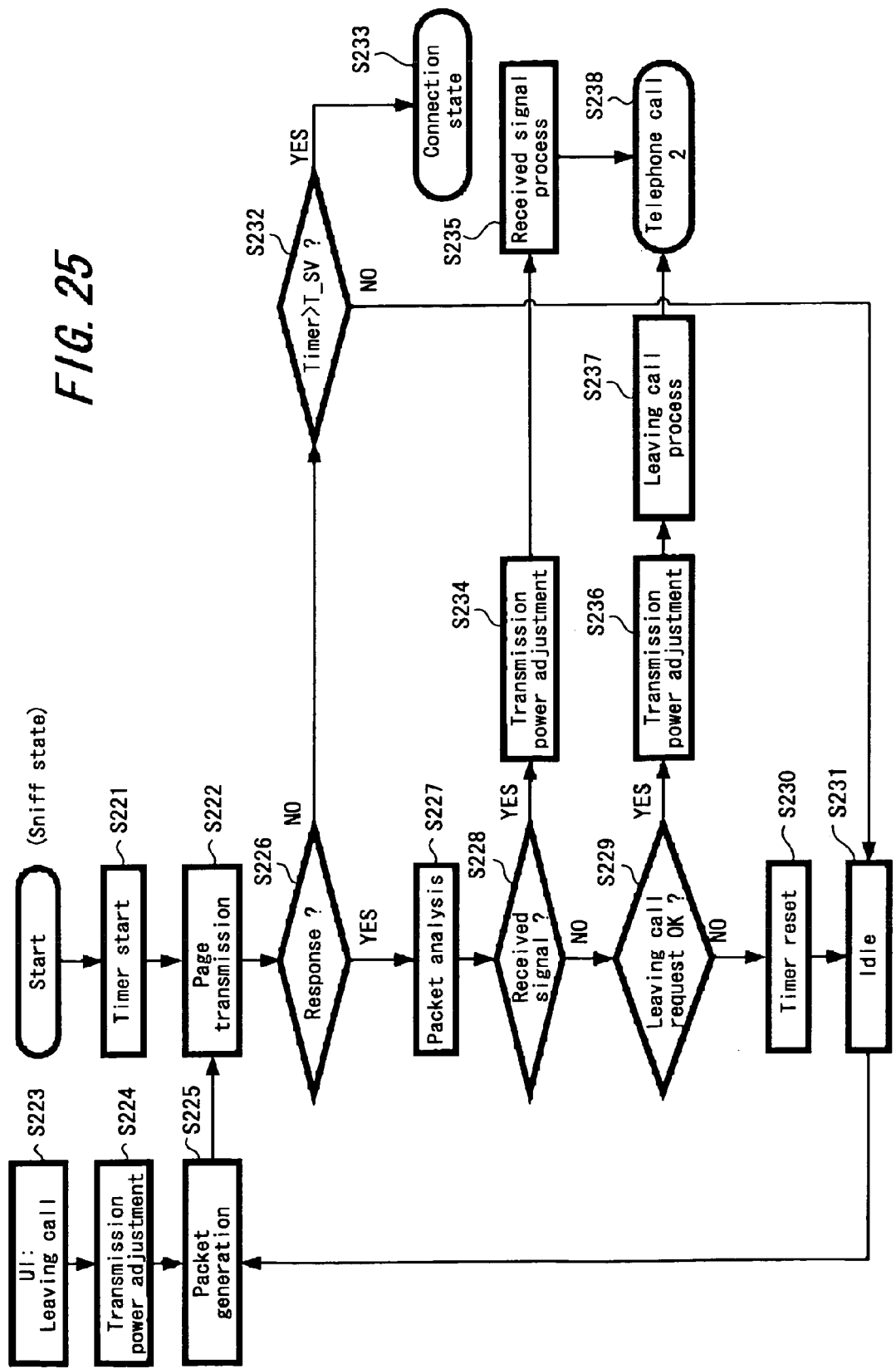
FIG. 25 is a flowchart showing a communication process example of a wireless key apparatus (with head set integrated) according to a still another exemplified embodiment of the present invention.

FIG. 25 is a flowchart showing a process example in the master (head set 60 with a wireless key) in a low power consumption mode (sniff mode). The process will be explained, wherein when it becomes a sniff mode, first, a timer is started (step S221) and a process for transmitting a page signal for a predetermined period is carried out (step S222). On the other hand, if a leaving call request by the user from UI such as an operation unit 64 or the like is detected (step S223), transmission power adjustment is carried out so as to maintain the connection (step S224), packets are created (step S225) and a page transmission process of step S222 is carried out. It is judged after the transmission of the page signal whether or not a response from the partner carrying out the security process (mobile telephone terminal apparatus 10) was received (step S226). Here, in a case when the response signal was received, the response result with respect to the transmission packet is analyzed (step S227), and subsequent processes are carried out in response to the content thereof.

First, it is judged whether or not the content of the packet is a leaving call request from the mobile telephone terminal apparatus 10 key (step S228).

In a case when it is not a received signal, it is judged next whether or not it is a leaving call request (step S229). Here, in a case when it is not a leaving call request, the timer started in step S221 is reset (step S230) and the flow is shifted to an idle period (step S231). When the idle period of a constant period elapses, the flow is shifted to step S225 and a packet transmission is carried out periodically. Here, in case of the present invention, it is constituted such that the idle period in step S231 (period when communication is not carried out) is set as a relatively longer period and at the same time, it is constituted such that it is synchronized with the idle period on the slave side.

On the other hand, in a case when it is judged in step S203 that a response from the mobile telephone terminal apparatus 10 is not received, it is judged whether or not the timer started in step S221 exceeded a predetermined value T_SV (step S232). Then, in a case when it does not exceed the predetermined value T_SV, the flow is shifted to the idle process of step S231. Then, in a case when step S232 it is judged it exceeds the predetermined value T_SV, the communication mode is changed to a connection mode M11 (step S233).

Also, in a case when it is judged in step S228 that it is a received signal from the mobile telephone terminal apparatus 10, the transmission power is changed over to a head set mode and a transmission power adjustment is carried out (transmission power increase or power control mode) so as to maintain the communication reliably (step S234). Then, an alert sound is generated from the speaker and at the same time a response is sent back to the mobile telephone terminal apparatus 10, and a receiving signal process by the user (key operation to the operation unit 64) is detected, it is notified to the mobile telephone terminal apparatus 10 (step S235) and the flow is shifted to a state of the communication 2 (step S238).

Also, in a case when it is judged in step S229 that it is a leaving call request by UI from the user, the transmission power is changed over to a head set mode and a transmission power adjustment is carried out (transmission power increase or power control mode) so as to maintain the communication reliably (step S236). Here, the head set mode means that it is made in a state in which the head set function can be used. Then, a leaving call process is carried out in response to the content appointed by the user (UI) (step S237) and the flow is shifted to a state of the telephone call 2 (step S217).

Figure 26:
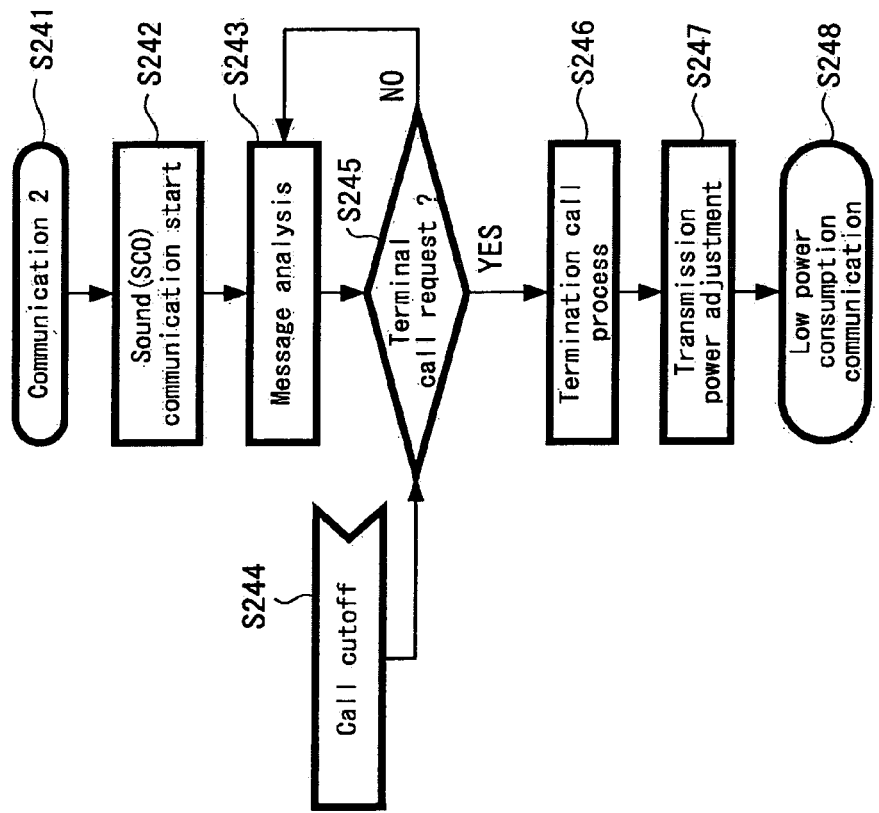
FIG. 26 is a flowchart showing a process example in a mobile terminal during an operation of a head set according to a still another exemplified embodiment of the present invention.

FIG. 26 a flowchart showing a process during the head set operation in the mobile telephone terminal apparatus 10. In the state of the communication 2 (step S241), a sound (SCO) communication is started (step S242), a received message is analyzed (step S243), it is judged whether or not there is a termination call request (step S245) and in a case when there is no termination call request, the flow returns to step S243. Here, in a case when there is a termination call request in the received message or a call cutoff request from an arbitrary telephone call partner side (step S244), a termination call process is carried out (step S246) and thereafter, a transmission power adjustment is carried out (step S247), and the flow is shifted to a low power consumption communication (step S248).

The transmission power adjustment in step S247 is to carry out a control for operating as the security (power control OFF and transmission power decreasing) and more specifically, it fixes to a power setting value in response to a distance desirable to presume (distance desirable for executing function limitation).

Figure 27:
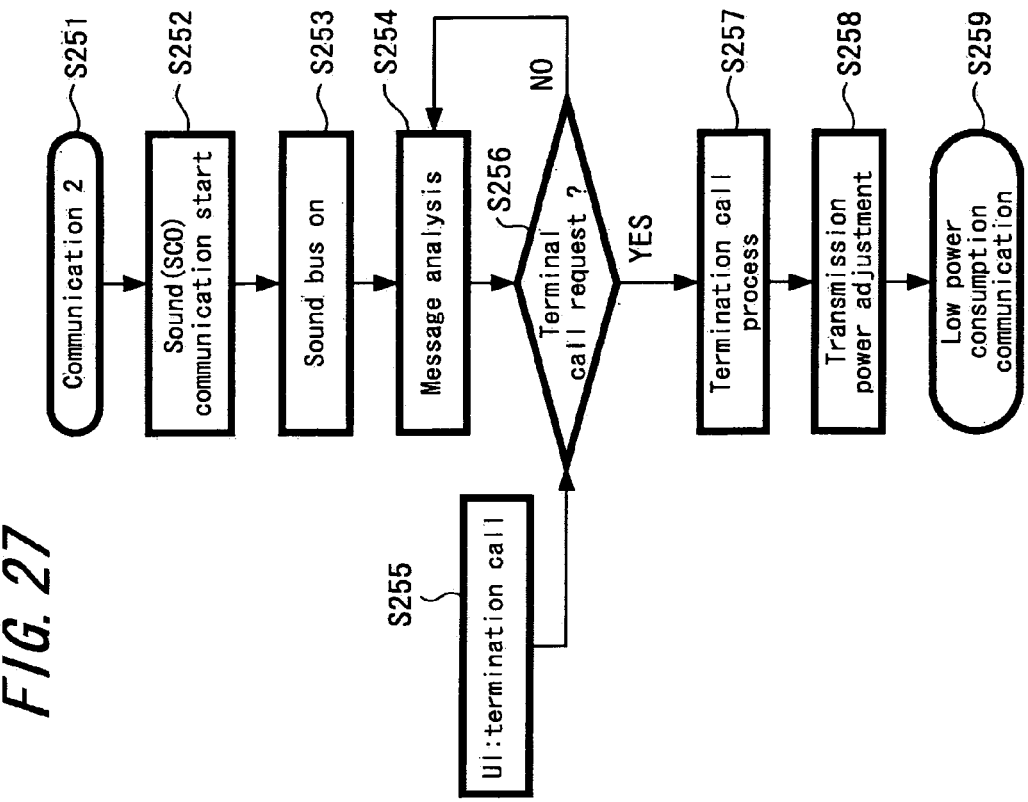
FIG. 27 is a flowchart showing a process example in a wireless key apparatus during an operation of a head set according to a still another exemplified embodiment of the present invention.

FIG. 27 a flowchart showing a process during the head set operation in the head set 60 with a wireless key. In the state of the communication 2 (step S251), a sound (SCO) communication is started (step S252) and the sound bus of the head set is made ON (step S253). Then, a received message is analyzed (step S254), it is judged whether or not there is a termination call request (step S256) and in a case when there is no termination call request, the flow returns to step S254. Here, in a case when there is a termination call request in the received message or a termination call request of a user from UI (step S255), a termination call process is carried out (step S257) and thereafter, a transmission power adjustment is carried out (step S258), and the flow is shifted to a low power consumption communication (step S259).

The transmission power adjustment in step S247 is to carry out a control for operating as the security (power control OFF and transmission power decreasing) similarly as the process in step S247 of FIG. 26 and more specifically, it fixes to a power setting value in response to a distance desirable to presume (distance desirable for executing function limitation).

In this manner, it is possible according to the exemplified embodiment to provide a function for presuming a distance between wireless apparatuses and a head set function which the Bluetooth system possesses in a single one apparatus concurrently by utilizing, for example, the short distance wireless communication of the Bluetooth system. When this wireless key function and the head set function are integrated, the transmission power of the wireless communication is changed from during the operation as a distance presumption (security) to during the operation of the head set function. For example, the power control carries out a high output transmission during a telephone call by the head set in order to maintain the communication and is to make a power setting in response to the presumed distance on the occasion of the distance presumption. Also, a transmission power control is carried out during a telephone call by the head set such that mutual received powers of the mobile telephone terminal apparatus 10 and the head set 60 with a wireless key become constant and on the occasion of the distance presumption, a fixed power setting in response to the distance desirable to presume is to be performed.

It is possible by employing such a constitution to integrate a wireless apparatus for security and a wireless head set function. It is enough for a user only to carry one single apparatus and it is possible to provide an inexpensively system, because a plurality of functions can be mounted on a single Bluetooth apparatus.

In the exemplified embodiment mentioned above, short distance wireless communication means of such as Bluetooth system or the like was installed in the mobile telephone terminal 10 and the short distance wireless communication means was used for actuating the security mode, but it may be constituted, for example, such that the short distance wireless communication is not installed in the mobile telephone terminal 10 the short distance wireless communication means is to be connected to the mobile telephone terminal 10 externally. More specifically, for example, two of an apparatus which corresponds to the wireless key apparatus are prepared and one of the two wireless key apparatuses is connected to the mobile telephone terminal 10 such that the security mode is to be set according to the communication mode of the two of wireless key apparatuses.

Also, in the exemplified embodiment explained so far, a communication circuit of a Bluetooth system was installed in a mobile telephone terminal such that a wireless communication is to be carried out with the wireless key apparatus by that communication circuit, but it may be constituted such that a wireless communication is to be carried out with the wireless key apparatus by means of another wireless communication system. More specifically, if it is a system which at least includes a first communication mode which enables a data transfer as a wireless communication system between both apparatuses which communicate each other and a second communication mode which carries out a wireless communication between both the apparatuses in a period shorter than that of the communication in the first communication mode in a wireless-connected state maintained, similar processes as those of the exemplified embodiment mentioned above are possible and applicable.

Also, in case of the Bluetooth system, one of the apparatus which carry out a communication becomes a master and the other one becomes slave and to make the above mentioned wireless key apparatus side be a master and to make the mobile terminal side be a slave is only one example and it is allowed to reverse the relation there-between. Also, it may be constituted such that the master and the slave are counterchanged on the communication halfway.

Also, in the exemplified embodiment mentioned above, it was applied to the security assuring process of the mobile telephone terminal apparatus, but it may be constituted such that it is applied to a process for assuring the security of other mobile type.

Further, also with respect to the wireless key apparatus, an example which was constituted as a key apparatus for exclusive use was employed in the exemplified embodiment mentioned above, but it may be constituted such that a program which makes if function as a key apparatus of the present invention is installed to a terminal apparatus capable of communicating by the Bluetooth system or the like (for example, PDA apparatus or the like) so as to function as a key apparatus. It should be understood by those skilled in the art that various modifications, combinations, sub-combinations and alterations may occur depending on design requirements and other factors insofar as they are within the scope of the appended claims or the equivalents thereof.

What is claimed is:

1. A head set apparatus capable of a wireless communication by a predetermined wireless communication system, comprising:

communication means for implementing a wireless communication by said predetermined wireless communication system; and control means for controlling the communication means,
wherein said predetermined wireless communication system includes at least a first communication mode for enabling a data transfer with a partner apparatus and a second communication mode for enabling a wireless communication with the partner apparatus with a period shorter than that of the communication in said first communication mode while the wireless connected state remains, wherein information of the partner apparatus is pre-registered in the head set apparatus and information of the head set apparatus is pre-registered in the partner apparatus to enable an exclusive communication between the head set apparatus and partner apparatus, wherein the pre-registered information of the partner apparatus and the head set apparatus are excluded from a user's revision, and wherein the control means causes said head set apparatus function as a head set when the communication state is in said first communication mode and causes said head set apparatus function as a wireless key for security when said communication state is in said second communication mode.

2. The head set apparatus according to claim 1, wherein said control means sets the transmission power of the wireless communication, when said head set apparatus functions as said head set, to be larger than when said head set apparatus functions as said wireless key.

3. A communication terminal apparatus capable of a wireless communication by a predetermined wireless communication system, comprising communication means for implementing a wireless communication by said predetermined wireless communication system; and control means for controlling the communication means, wherein said predetermined wireless communication system includes at least a first communication mode for enabling a data transfer with a partner apparatus and a second communication mode for enabling a wireless communication with the partner apparatus with a period shorter than that of the communication in said first communication mode while the wireless connected state remains, wherein information of the partner apparatus is pre-registered in the head set apparatus and information of the head set apparatus is pre-registered in the partner apparatus to enable an exclusive communication between the head set apparatus and partner apparatus, wherein the pre-registered information of the partner apparatus and the head set apparatus are excluded from a user's revision, and wherein the control means causes said communication terminal apparatus implement a data communication with said communication partner apparatus when the communication state is in said first communication mode and causes said communication terminal apparatus function as a wireless key for security when said communication state is in said second communication mode.

4. The communication terminal apparatus according to claim 3, wherein said control means sets the transmission power of the wireless communication, when said communication terminal apparatus communicates with said communication partner terminal, to be larger than when said communication terminal apparatus functions as said wireless key.

5. A communication system including a head set apparatus and a communication terminal apparatus capable of a wireless communication with the head set apparatus by a predetermined wireless communication system, wherein said predetermined wireless communication system includes at least a first communication mode for enabling a data transfer with a partner apparatus and a second communication mode for enabling a wireless communication with the partner apparatus with a period shorter than that of the communication in said first communication mode while the wireless connected state remains, wherein said head set apparatus comprises:

first communication means for implementing a wireless communication by said predetermined wireless communication system, and first control means for causing said head set apparatus function as a head set when said communication state is in said first communication mode and for causing said head set apparatus function as a wireless key for security when said communication state is in said second communication mode; and wherein said communication terminal apparatus comprises:

second communication means for implementing a wireless communication by said predetermined wireless communication system, and second control means for causing said communication terminal apparatus implement a data communication with said communication partner apparatus when the communication state is in said first communication mode and for causing said communication terminal apparatus function as a wireless key for security when said communication state is in said second communication mode, and wherein information of the partner apparatus is pre-registered in the head set apparatus and information of the head set apparatus is pre-registered in the partner apparatus to enable an exclusive communication between the head set apparatus and partner apparatus, wherein the pre-registered information of the partner apparatus and the head set apparatus are excluded from a user's revision.

* * * * *